(12) United States Patent
Conner

(10) Patent No.: US 9,188,759 B2
(45) Date of Patent: Nov. 17, 2015

(54) OPTICAL CONNECTION TERMINAL HAVING PORT MAPPING SCHEME

(75) Inventor: Mark E. Conner, Granite Falls, NC (US)

(73) Assignee: Corning Cable Systems LLC, Hickory, NC (US)

( * ) Notice: Subject to any disclaimer, the term of this patent is extended or adjusted under 35 U.S.C. 154(b) by 2000 days.

(21) Appl. No.: 12/323,385

(22) Filed: Nov. 25, 2008

(65) Prior Publication Data

US 2010/0092133 A1     Apr. 15, 2010

Related U.S. Application Data

(60) Provisional application No. 61/105,306, filed on Oct. 14, 2008.

(51) Int. Cl.
*G02B 6/00*     (2006.01)
*G02B 6/44*     (2006.01)

(52) U.S. Cl.
CPC ............ *G02B 6/4452* (2013.01); *G02B 6/4453* (2013.01)

(58) Field of Classification Search
None
See application file for complete search history.

(56) References Cited

U.S. PATENT DOCUMENTS

| 7,088,891 B2 * | 8/2006 | Jung et al. ................. 385/45 |
| 2005/0036749 A1 * | 2/2005 | Vogel et al. ................. 385/100 |
| 2006/0269208 A1 * | 11/2006 | Allen et al. ................. 385/135 |
| 2008/0193091 A1 | 8/2008 | Herbst ................. 385/111 |

OTHER PUBLICATIONS

Tanji, et al., "Optical Fiber Cabling Technologies for Flexible Access Network," Optical Fiber Technology, Academic Press, London, US, vol. 14, No. 3, Jul. 1, 2008, 8 pages.
Patent Cooperation Treaty, International Search Report for International Application No. PCT/US2009/057140, Nov. 9, 2009, 2 pages.

* cited by examiner

*Primary Examiner* — Uyen Chau N Le
*Assistant Examiner* — Hoang Tran

(57) ABSTRACT

A fiber optic network device for optically coupling a fiber optic distribution cable with a fiber optic drop cables is disclosed. Disposed within the fiber optic network device is a plurality of optical fibers optically coupled to the distribution cable. A plurality of ports opens into the fiber optic network device. Predetermined ones of the plurality of ports are operable for optically coupling respective predetermined ones of the plurality of optical fibers each to at least one drop cable external to the fiber optic network device. At least one of the predetermined ones of the plurality of ports is a pass-through port operable for optically coupling at least one of the respective pre-determined ones of the plurality of optical fibers to the at least one drop cable through another fiber optic network device. A pass-through connector comprising a plurality of connection ports adapted for receiving in a predetermined alignment the respective pre-determined ones of the plurality of optical fibers may be seated within the pass-through port. The fiber optic network device may be an optical connection terminal and/or a distribution closure. The fiber optic network device may further include one or more splitters. The predetermined ones of a plurality of ports may be operable for optically coupling at least one of the respective predetermined ones of the plurality of optical fibers to a drop cable through one or more splitters.

25 Claims, 19 Drawing Sheets

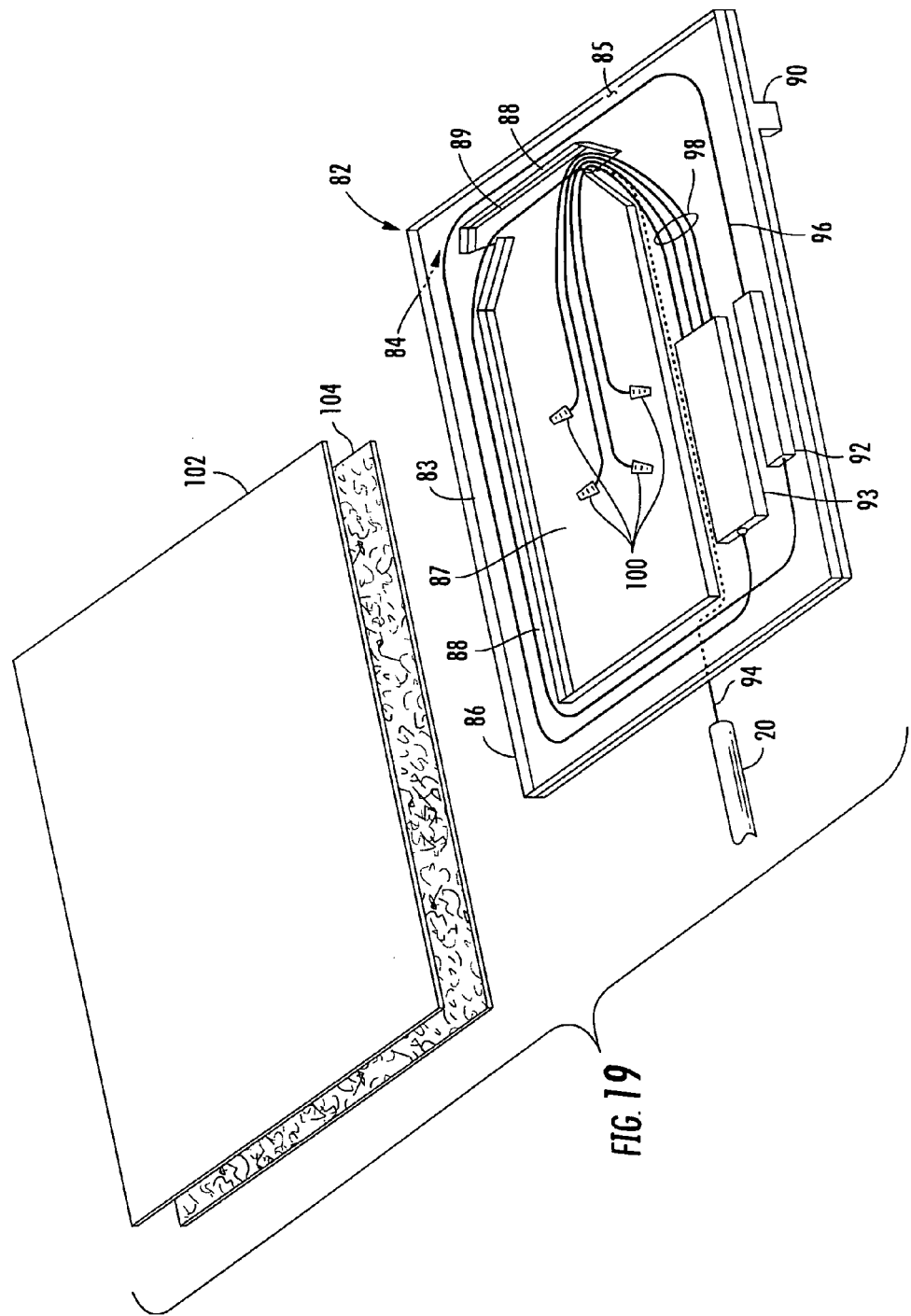

OPTICAL CONNECTION TERMINAL HAVING PORT MAPPING SCHEME

CROSS-REFERENCE TO RELATED APPLICATIONS

This application claims the benefit of priority to U.S. Provisional Application No. 61/105,306, filed on Oct. 14, 2008, the contents of which are relied upon and incorporated herein by reference in its entirety.

This application is related to co-pending U.S. patent application Ser. No. 12/323,344 entitled "METHODS OF PORT MAPPING IN FIBER OPTIC NETWORK DEVICES," which is incorporated herein by reference in its entirety.

This application is related to co-pending U.S. patent application Ser. No. 12/323,395 entitled "FIBER OPTIC NETWORK ARCHITECTURE HAVING OPTICAL CONNECTION TERMINALS IN SERIES ARRANGEMENT," which is incorporated herein by reference in its entirety.

This application is related to co-pending U.S. patent application Ser. No. 12/323,356 entitled "MULTI-LEVEL DISTRIBUTED FIBER OPTIC ARCHITECTURES" which is incorporated herein by reference in its entirety.

This application is related to co-pending U.S. patent application Ser. No. 12/323,373 entitled "OPTICAL FIBER MANAGEMENT SHELF FOR OPTICAL CONNECTION TERMINALS," which is incorporated herein by reference in its entirety.

BACKGROUND

1. Technical Field

The present invention relates generally to fiber optic network devices, and more particularly to optical connection terminals for optically interconnecting fiber optic distribution cables to fiber optic drop cables using a port mapping scheme.

2. Technical Background

Optical fiber is increasingly being used for a variety of broadband applications including voice, video and data transmissions. As a result of the ever-increasing demand for broadband communications, telecommunication and cable media service providers and/or operators are expanding their fiber optic networks to increase their networks' capacity and reach to provide more services, applications and information to more proximate and distant subscribers. To facilitate this capacity and reach, the fiber optic networks must employ additional fiber optic cable, hardware and components resulting in increased installation time, cost and maintenance. This results in the fiber optic networks becoming more complex, requiring architectures that allow for the most efficient delivery of fiber optic service to the subscriber. These architectures typically employ fiber optic network devices, such as optical connection terminals, for example, in branches of the fiber optic network. The fiber optic network devices act to optically interconnect the fiber optic cables of the branch, separate or combine optical fibers in multi-fiber cables, and/or split or couple optical signals, as may be necessary.

For example, a multi-fiber feeder cable from a central office or a transport cable from a head end, may connect to multiple multi-fiber distribution cables. Each distribution cable then may extend to a designated geographic area, thereby providing the optical service to subscribers in that area. A fiber optic drop cable from the subscriber premises may connect to the distribution cable to establish optical connectivity between the service provider and the subscriber in a fiber to the premises (FTTP) optical network. However, extending the drop cable from the subscriber premises all the way to the distribution cable may require a substantial length of drop cable resulting in extensive cost and installation time. Moreover, the cost and installation time would be increased and compounded if a separate connection to the distribution cable was needed for each drop cable. To reduce the attendant cost and timing, while still maintaining optical connectivity between the distribution cable and the drop cable, and, thereby, between the service provider and the subscriber, one or more intermediate optical connection points, between the distribution cable and the drop cable may be incorporated.

To incorporate the intermediate optical connection points, a branch of the fiber optic network off of the distribution cable is established. The branch may be established at a branching point on the distribution cable, such as at a mid-span access location. An optical connection terminal may be used as the intermediate optical connection point and be centrally located to all of the subscribers being served by that branch. Therefore, the drop cables may extend from the subscriber premises and connect to ports on the optical connection terminal instead of directly to the distribution cable. However, the optical connection terminals typically are configured for and adapted to optically interconnect to the distribution cable only the drop cables connected to that particular optical connection terminal. Thus, each optical connection terminal has its own dedicated branch, i.e., stub cable, to provide optically connectivity with the distribution cable at the mid-span access location.

In situations where there are many subscriber premises to be served by one mid-span access location, more than one optical connection terminal in the branch from that one mid-span access location may be needed. This is particularly applicable where the subscriber premises are separated by appreciable distances, for example without limitation, in rural areas. In such case, given the above-mentioned configuration of the optical connection terminals and due to the dedicated branch (stub) cable, a separate branch with associated branch cable may have to be extended from the mid-span access location to each optical connection terminal.

Similar to the drop cable situation, the cost of the branch cable is generally charged on a per foot installed basis. Accordingly, installing separate branch cables from one mid-span access location to each optical connection terminal may be excessively costly and time consuming. Alternatively, an additional enclosure may be used with individual optical connection terminals to separate out the optical fibers from the branch cable for extending to the optical connection terminal and connecting to the drop cables. Either such case is expensive and time consuming. As such, the current configuration of the optical connection terminal precludes the feasibility of designing and using effective distributive hierarchical branching architectures as the FTTP optical network extends toward the subscriber premises.

SUMMARY

According to one aspect, there is provided a fiber optic network device for optically coupling a fiber optic distribution cable with a fiber optic drop cables. Disposed within the fiber optic network device is a plurality of optical fibers optically coupled to the distribution cable. A plurality of ports opens into the fiber optic network device.

Predetermined ones of the plurality of ports are operable for optically coupling respective predetermined ones of the plurality of optical fibers each to at least one drop cable external to the fiber optic network device.

Further, at least one of the predetermined ones of the plurality of ports is a pass-through port operable for optically coupling at least one of the respective pre-determined ones of the plurality of optical fibers to the at least one drop cable through another fiber optic network device. A pass-through connector comprising a plurality of connection ports adapted for receiving in a predetermined alignment the respective pre-determined ones of the plurality of optical fibers may be seated within the pass-through port.

The fiber optic network device may be an optical connection terminal and/or a distribution closure. The fiber optic network device may further include one or more splitters. The predetermined ones of a plurality of ports may be operable for optically coupling at least one of the respective predetermined ones of the plurality of optical fibers to a drop cable through one or more splitters.

According to another aspect, there is provided an optical connection terminal for optically connecting a fiber optic distribution cable with fiber optic drop cables. The optical connection terminal comprises an enclosure defining an exterior surface and an interior cavity. The enclosure has a cable opening in the exterior surface for receiving a first segment of a branch cable having a plurality of optical fibers optically coupled to the distribution cable. A plurality of ports is disposed in the exterior surface. The optical connection terminal is configured such that ones of the plurality of ports are operable for optically coupling ones of the plurality of optical fibers each to at least one drop cable external to the optical connection terminal based on a port mapping scheme.

The plurality of ports may comprise at least one drop port and at least one pass-through port. The pass-through port may be operable for optically coupling certain of the ones of the plurality of optical fibers to the at least one drop cable through another optical connection terminal external to the optical connection terminal. The another optical connection terminal may comprise a second pass-through port having a second pass-through connector. The second pass-through connector may have connection ports adapted for receiving a plurality of optical fibers in the predetermined alignment. Also, the optical connection terminal may include one or more splitters. At least one of the plurality of ports may be operable for optically coupling at least one of the plurality of optical fibers to a drop cable through the splitter based on the port mapping scheme.

According to another aspect, there is provided a method for optically coupling a fiber optic distribution cable with fiber optic drop cables. The method comprises disposing a plurality of optical fibers optically coupled to the distribution cable in a fiber optic network device and providing a plurality of ports that open into the fiber optic network device. The method also comprises pre-configuring the fiber optic network device such that predetermined ones of the plurality of ports are operable for optically coupling the respective pre-determined ones of the plurality of optical fibers each to a drop cable external to the fiber optic device.

According to another aspect, there is provided a method for optically coupling a fiber optic distribution cable with fiber optic drop cables. The method comprises providing an optical connection terminal comprising an enclosure defining an exterior surface and an interior cavity. The enclosure has a cable opening in the exterior surface for receiving a first segment of a branch cable having a plurality of optical fibers optically coupled to the distribution cable. The method also comprises disposing a plurality of ports in the exterior surface such that the plurality of ports open into the interior cavity, and pre-configuring the optical connection terminal wherein ones of the plurality of ports are operable for optically coupling ones of the plurality of optical fibers each to at least one drop cable external to the optical connection terminal based on a port mapping scheme.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description are merely exemplary embodiments, and are intended to provide an overview or framework for understanding the nature and character of the invention as it is claimed.

The accompanying drawings are included to provide a further understanding of the principles of the invention, and are incorporated into and constitute a part of this specification. The drawings illustrate one or more embodiment(s), and together with the description serve to explain the principles and operation of the invention. It is to be understood that various features of the invention disclosed in this specification and in the drawings can be used in any and all combinations.

BRIEF DESCRIPTION OF THE FIGURES

The foregoing and other features, aspects, and advantages of the present disclosure may be better understood when the following detailed description is read with reference to the accompanying drawings, in which:

FIG. 19 is a perspective view of an optical fiber management shelf, according to an exemplary embodiment.

DETAILED DESCRIPTION

Figure 1:
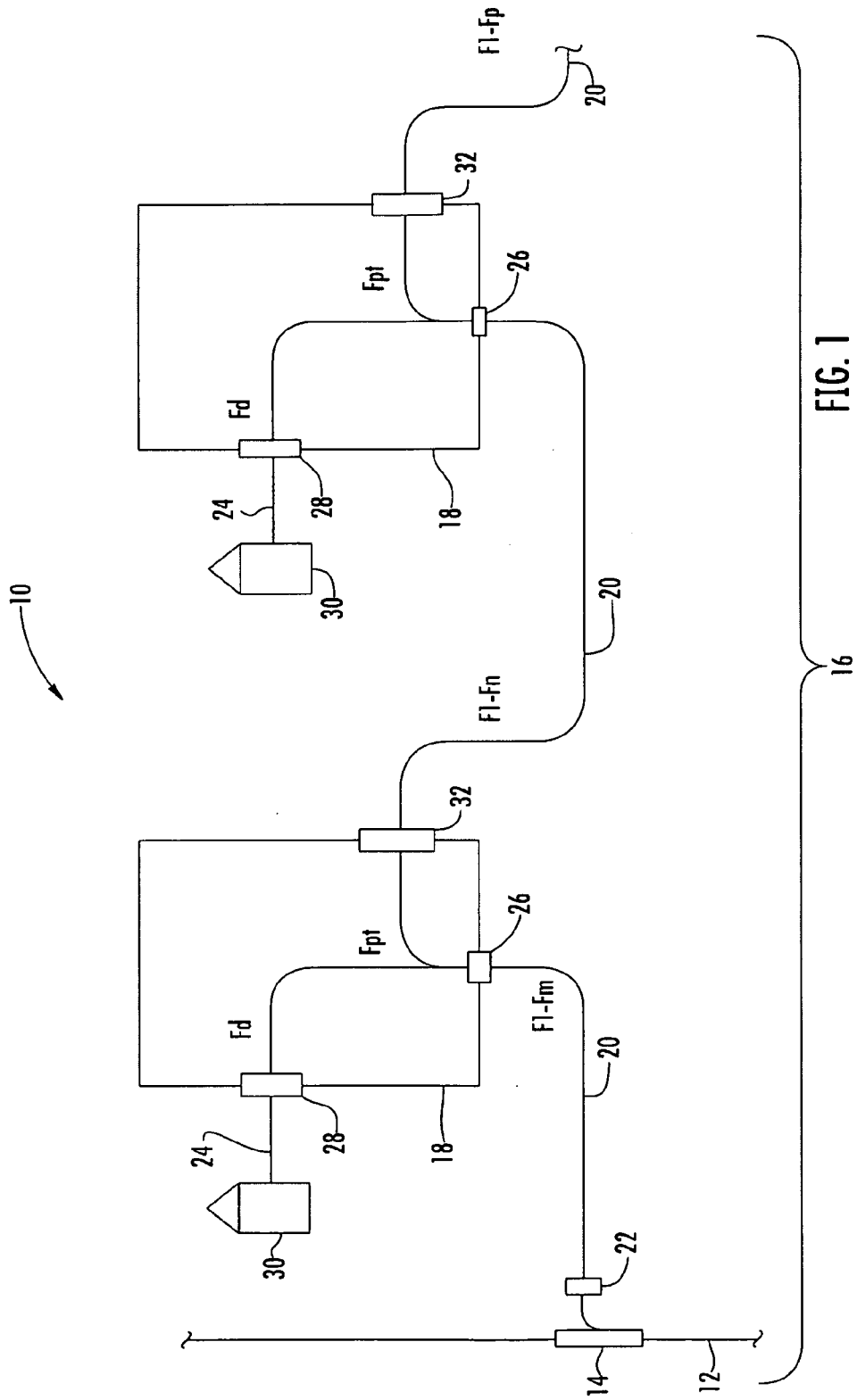
FIG. 1 is a schematic diagram of a portion of a fiber optic network according to an exemplary embodiment, which includes a distribution cable having a mid-span access location serving as a branching point for a branch comprising multiple optical connection terminals of which two are shown.

In the following detailed description, for purposes of explanation and not limitation, example embodiments disclosing specific details are set forth to provide a thorough understanding of the principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the principles of the present invention. Finally, wherever applicable, like reference numerals refer to like elements.

Various embodiments of a fiber optic network device having a port mapping scheme are provided. To facilitate the description of the various embodiments, an optical connection terminal may be used. It should be understood that as used herein the term optical connection terminal is not limited to any specific type, style, structure, construction or arrangement of fiber optic network device. Accordingly, for purposes herein optical connection terminal shall mean and include, but is not limited to, devices and/or structures which may typically be referred to as a local convergence point, a fiber distribution hub, a fiber distribution cabinet, a splitter cabinet, a multiport, a fiber terminal, a multiple dwelling closure, a local convergence cabinet, a pedestal, a network access point, a distribution closure, and the like.

Further, as used herein and well known and understood in the art, the term "drop cable" shall mean and include a fiber optic cable from a subscriber premises. Also, the term "distribution cable" shall mean and include any one or more of fiber optic cables in the form of a feeder cable from a central office of a telecommunications service provider or operator, a transport cable from a head end of cable media service provider or operator, as well as a fiber optic cable that may be optically connected to a feeder cable or a transport cable and used to further distribute the optical services toward a subscriber premises. The term "branch cable" shall mean and include any fiber optic cable, including but not limited to, a tether cable and/or a stub cable, as those terms are known in the art, and any other cable that may optically connect to and/or extend from a distribution cable for the purpose of optically connecting the distribution cable to a drop cable. The distribution cable, branch cable and/or drop cable may be any type of fiber optic cable having one or more optical fibers. The term "optical fiber" is intended to include all types of single mode and multi-mode light waveguides, including one or more bare optical fibers, loose-tube optical fibers, tight-buffered optical fibers, ribbonized optical fibers, bend insensitive optical fibers, or any other expedient of a medium for transmitting light signals.

The drop cable may be, "pre-connectorized" to be readily connected to and disconnected from a drop port of the optical connection terminal. At the other end, the drop cable may be optically coupled to optical fibers within a conventional closure, such as, but not limited to, a network interface device (NID) of the types available from Corning Cable Systems LLC of Hickory, N.C. In the exemplary embodiments shown and described herein, the drop cables extend from a closure located at a subscriber premises and are optically coupled through the drop ports of the optical connection terminal to one or more optical fibers of a branch cable. In turn, the optical fibers of the branch cable are optically coupled to optical fibers of the distribution cable, at a mid-span access location on the distribution cable. The mid-span access location may be provided at an aerial closure, a buried closure (also referred to as a below grade closure) or an above ground telecommunications cabinet, terminal, pedestal, or the like. Likewise, the optical connection terminal may be provided at an aerial location, such as mounted to an aerial strand between utility poles or mounted on a utility pole, at a buried location, such as within a hand-hole or below grade vault, or at an above-ground location, such as within a cabinet, terminal, pedestal, above grade vault, or the like. Thus, the optical connection terminal provides an accessible interconnection terminal for readily connecting, disconnecting or reconfiguring drop cables in the optical network, and in particular, for optically coupling drop cables with a distribution cable. The terms connect, interconnect, and couple shall be understood to mean, without limitation, the passage, flow, transmission, or the like of an optical signal between one or more of optical cables, optical fibers, components, and/or connectors, or the like and one or more of optical cables, optical fibers, components, and/or connectors, or the like; whether or not by direct or indirect physical connection, to establish optical communication or connectivity.

A branching point may be established at a mid-span access location and/or at the end of a distribution cable. For purposes herein, reference to mid-span access location shall be understood to also include the end of the distribution cable. The direction in the branch cable toward or facing the mid-span access location may be referred to as "upstream" and the direction facing away from the mid-span access location may be referred to as "downstream." It should be understood, though, that using the terms "upstream" or "downstream" does not indicate the direction in which the optical signals are transmitted or carried in the optical fibers. Thus, an optical signal may be transmitted in both the upstream or downstream direction.

Due to the port mapping scheme more than one optical connection terminal may be included in the branch. Because more than one optical connection terminal may be included in the branch, distributed, hierarchical architectures may be employed to position the optical connection terminals at more convenient locations with respect to the subscriber premises. As a result, drop cables extending from a subscriber premises may be optically coupled to the fiber optic network at an optical connection terminal more closely located to the subscriber premises as opposed to an optical connection terminal located more distantly or at the actual mid-span access location provided on the distribution cable. Thus, the overall length of the drop cables may be substantially reduced.

Optical Connection Terminal with Port Mapping Scheme

Referring now to FIG. 1, there is shown an exemplary embodiment of optical connection terminals configured with a port mapping scheme in a fiber optic network 10, which may be at any point in the fiber optic network, near to or distant from the central office or head end. The fiber optic network comprises a fiber optic distribution cable 12, a mid-span access location 14, and multiple optical connection terminals 18, only two of which are shown. The mid-span access location 14 provides a branch point for branch 16. A branch cable 20 is shown connected to the distribution cable 12 through network connector 22 and extending to the optical connection terminals 18 through branch cable opening 26. A drop cable 24 extends from the optical connection terminal 18 to subscriber premises 30. In this manner, branch cable 20 provides optical communication between the distribution cable 12 and the subscriber premises 30 through the optical connection terminals 18.

The branch cable 20 is shown in segments with each segment of the branch cable 20 comprising optical fibers designated by the letter "F." A segment of the branch cable 20 is shown extending from the distribution cable 12 at mid-span access point 14 to an optical connection terminal 18, while another segment of the branch cable 20 is shown extending from one of the optical connection terminals 18 to another one of the optical terminals 18. The segment of the branch cable 20 extending from the distribution cable 12 comprises optical fibers F1-Fm. The segment of the branch cable 20 that extends from one of the optical connection terminals 18 to another one of the optical connection terminals 18 comprises optical fibers F1-Fn and F1-Fp, respectively. The designation of "m", "n" and "p" indicates the number of optical fibers in that segment of the branch cable 20. In this exemplary embodiment, "m," "n" and "p" may be equal, indicating that the number of fibers is the same in each segment of branch cable 20, or, alternatively, one of more of m, n and p may be different, indicating that one or more of the segments of the branch cable 20 may comprise a different number of optical fibers than another segment of the branch cable 20. Additionally or alternatively, one or more of m, n and p may equal 1.

In FIG. 1, the optical connection terminals 18 each are configured with a port mapping scheme. The port mapping scheme predetermines the routing and optical coupling of the optical fibers in the branch cable 20 via the drop port 28 and/or via the pass-through port 32, and/or via a component, and/or via a connector (not shown), and/or the like in one or both of the optical connection terminals 18. In this embodiment, optical fibers "F1-Fm" of the segment of branch cable 20 enter the first optical connection terminal 18 via branch cable opening 26. At least one of the optical fibers F1-Fm, designated as Fd, routes to at least one drop port 28 based on the port mapping scheme. Additionally or alternatively, at least one of the optical fibers F1-Fm, designated as Fpt routes to the pass-through port 32 also based on the port mapping scheme. The optical fiber designated as Fpt may or may not be and/or include the optical fiber designated as Fd depending on the port mapping scheme.

A segment of the branch cable 20 comprising optical fibers designated as F1-Fn extends from the first optical connection terminal 18 to the second optical connection terminal 18. The pass-through port 32 is operable for optically coupling the optical fiber Fpt to one of the optical fibers F1-Fn in the segment of the branch cable 20 that extends from the first optical connection terminal 18. The optical fibers F1-Fn of the segment of branch cable 20 enter the second optical connection terminal 18 via the branch cable opening 26. Similar to the first optical connection terminal 18, in the second optical connection terminal 18 the optical fiber designated as Fd, of optical fibers F1-Fn, routes to the drop port 28 based on a port mapping scheme. Also similar to the first optical connection terminal 18, the optical fiber Fpt of the optical fibers F1-Fn routes to the pass-through port 32 based on a port mapping scheme. And the optical fiber Fpt may or may not be or include Fd depending on the port mapping scheme. Whether optical fibers designated as Fd optically couple with the first drop cable 24 via the drop port 28 in the first optical connection terminal 18 and/or optically couple with the second drop cable 24 via the drop port 28 in the second optical connection terminal 18 is predetermined based the desired port mapping scheme.

Although not shown in FIG. 1, a multi-fiber connector may be used to connect the segment of the branch cable 20 extending from the first optical connection terminal 18 to the pass-through port 32 of the first optical connection terminal 18. In such case, the manner in which optical fiber Fpt connects to the connector may be in a pre-determined alignment to result in the desired port mapping scheme. Additionally, a multi-fiber connector and or a splice, such as a fusion splice, may be used to connect the segment of the branch cable 20 to an optical connection terminal 18 in, through and/or instead of the branch cable port 26.

The port mapping scheme of the first optical connection terminal 18 may or may not be the same as the port mapping scheme of the second optical connection terminal 18. However, the port mapping scheme of either and/or both the first and second optical connection terminals 18 serves to predetermine the routing and optical coupling of optical fibers Fd and Fpt for both the first and second optical connection terminals 18. In other words, the port mapping scheme predetermines the routing and optical coupling not only of the distribution cable 12 and the drop cable 24 extending from the drop port 28 of the first optical connection terminal 18, but also of the distribution cable 12 and the drop cable 24 extending from the drop port 28 of the second optical connection terminal 18 in branch 16. And, accordingly, the port mapping scheme, predetermines the optical coupling of the distribution cable 12 and the drop cable 24 extending from the drop port 28 of the second optical connection terminal 18 through the pass-through port 32 of the first optical connection terminal 18. Further, a segment of the branch cable 20 comprising optical fibers designated as "F1-Fp," may extend from the second optical connection terminal 18 to successive optical connection terminal 18 in the branch 16. The successive optical connection terminal 18 may also be configured with a port mapping scheme. In this manner, the port mapping scheme may predetermine the optical coupling between the distribution cable 12 and the drop ports 28 of the optical connection terminals 18 in the branch 16.

Although not shown in FIG. 1, the optical connection terminal 18 may include other optical components including, but not limited to a splitter, splice protector, WDM device, splice holder and tray, routing guide and slack storage. The port mapping scheme may predetermine the configuring of the optical connection terminal with one or more of these other optical components, and/or the routing of optical fibers to and optically coupling of optical fibers with one or more of the components. As an example, an optical fiber from the branch cable 20 may optically couple to a splitter. The optical signal carried by that optical fiber may be split into multiple optical signals by the splitter. Optical fibers carrying the optical signals may optically couple to a drop cable via one or more of the drop connector ports and/or pass-through connector ports. The optical fiber Fd may output from the splitter and route to the drop port 28 in the optical connection terminal 18.

Figure 2:
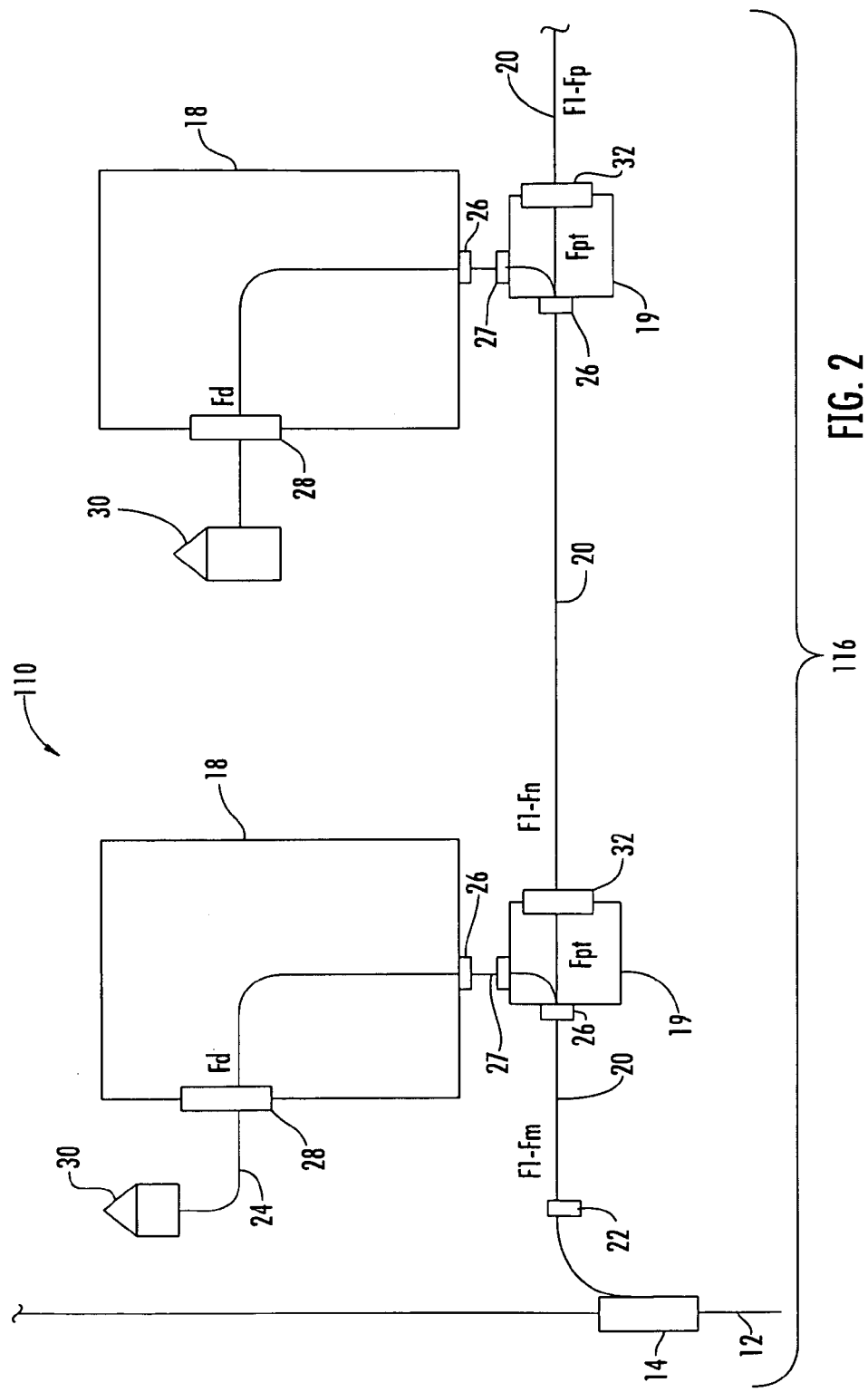
FIG. 2 is a schematic diagram of a portion of a fiber optic network according to an exemplary embodiment, which includes a distribution cable having a mid-span access location serving as a branching point for a branch comprising multiple optical connection terminals and multiple distribution closures of which two are shown.

Turning now to FIG. 2, there is shown a branch 116 of a fiber optic network 110 comprising the optical connection terminals 18 and at least one distribution closure 19 external to the optical connection terminals 18. In FIG. 2, the distribution closures 19 are configured with a port mapping scheme as well as the optical connection terminals 18. In this embodiment, two distribution closures 19 are shown, being first and second distribution closures 19. The branch cable 20 comprising optical fibers F1-Fm enters the first distribution closure 19 via branch cable port 26 disposed in the first distribution closure 19. In the first distribution closure 19, optical fiber Fd routes to the first optical connection terminal 18 via distribution port 27 disposed in the first distribution closure 19 and the branch cable port 26 disposed in the first optical connection terminal 18. Optical fiber Fpt routes to the pass-through port 32 disposed in the first distribution closure 19. The segment of the branch cable 20 comprising optical fibers designated as F1-Fn, extends from the first distribution closure 19 to the second distribution closure 19. The pass-through port 32 is operable for optically coupling the optical fiber Fpt of one of the optical fiber F1-Fn in the segment of the branch cable 20 that extends from the first optical connection terminal 18.

The branch cable 20 comprising optical fibers F1-Fn enters the second distribution closure 19 via branch cable port 26 disposed in the second distribution closure 19. In the second distribution closure 19, optical fiber Fd routes to the second optical connection terminal 18 via distribution port 27 disposed in the second distribution closure 19 and the branch cable port 26 disposed in the second optical connection terminal 18. Optical fiber Fpt routes to the pass-through port 32 disposed in the second distribution closure 19. The segment of the branch cable 20 comprising optical fibers designated as F1-Fp extends from the second distribution closure 19 to successive optical connection terminals 18 and/or distribution closures 19 in the branch 116. As with the branch 16 depicted in FIG. 1, the port mapping scheme determines the routing of the optical fibers and the optical coupling between the distribution cable 12 and the drop ports 28 of the optical connection terminals 18 in the branch 116.

Examples of Port Mapping Schemes

As discussed above, the port mapping scheme predetermines the routing and optical coupling of the optical fibers of the branch cable 20 to establish the optical communication between the distribution cable 12 and subscriber premises 30. In particular, the port mapping scheme may predetermine which optical fibers optically couple to drop cables via drop ports 28, and which optical fibers optically couple to drop cables via pass-through ports 32 in each optical connection terminal 18 in the branch 16. Additionally, a multi-fiber connector may be seated in the pass-through port 32, in which case the port mapping scheme may determine to which port of the connector the optical fibers Fpt may be optically coupled. Exemplary embodiments of port mapping schemes are shown in FIGS. 3-9. It should be understood that the port mapping schemes and the number of optical fibers in the branch cable 20 shown in FIGS. 3-9 are merely exemplary and do not limit the types or designs of port mapping schemes that may be used or the number of optical fibers in the branch cable 20.

Figure 3:
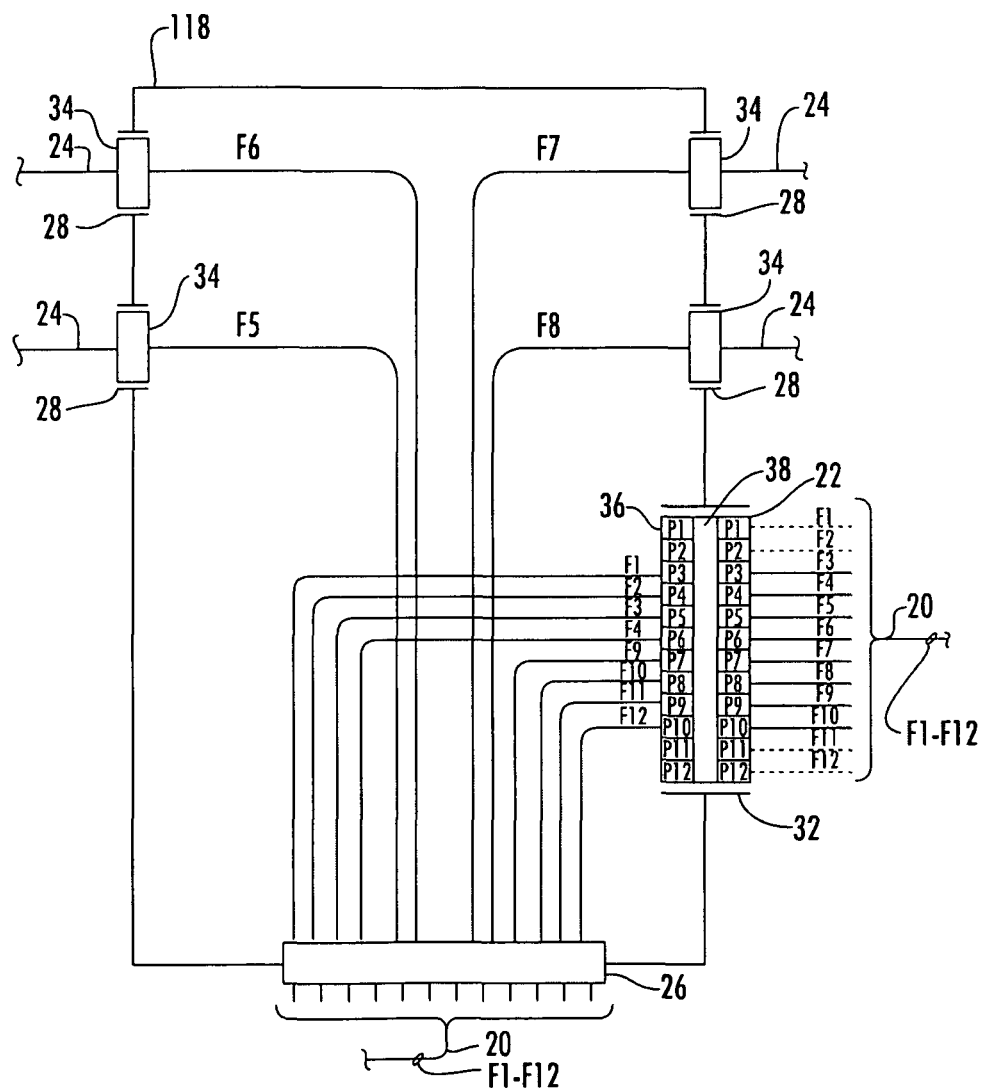
FIG. 3 is a schematic diagram of an optical connection terminal comprising four drop ports and a pass-through port operable for optically coupling predetermined ones of a plurality of optical fibers each to a drop cable based on an exemplary form of a port mapping scheme, according to an exemplary embodiment.

Turning now to FIG. 3, the branch cable 20 enters the optical connection terminal 118 through the branch cable opening 26. In this embodiment, optical connection terminal 118 comprises four drop ports 28 and one pass-through port 32. The branch cable 20 comprises twelve optical fibers, which are shown designated as F1 through F12. The port mapping scheme utilized with the optical connection terminal 118 depicted in FIG. 3 uses the middle four optical fibers of the twelve optical fibers of branch cable 20. In this respect, the middle four optical fibers designated F5, F6, F7, and F8, route to the drop ports 28 and optically couple to drop cables 24 via the drop ports 28. The optical fibers F5, F6, F7, and F8 may be connectorized and connect to adapters 34 seated in the drop ports 28. The drop cables 24 may be pre-connectorized and connect to the optical fibers through the adapter 34.

The optical fibers on either side of the middle four optical fibers, being optical fibers F1, F2, F3, F4, F9, F10, F11, and F12, may be routed to the pass-through port 32. In FIG. 3, a pass-through connector 36 seats in the pass-through port 32 and connects to the multi-fiber adapter 38. Alternatively, a splice, such as a fusion splice may be used instead of a pass-through connector 36. The optical fibers F1, F2, F3, F4, F9, F10, F11, and F12 connect to pass-through connector 36 at the connection ports P3, P4, P5, P6, P7, P8, P9, and P10, respectively. Thus, due to the port mapping scheme, the connection ports P1, P2, P11, and P12 on the pass-through connector 36 do not have an optical fiber connected to them, and, therefore, no optical signal passes through those connection ports. The branch cable 20 that extends from one optical connection terminals 118 to another is also has twelve optical fibers, and connects to the multi-fiber adapter 38 through a network connector 22. The connection ports of the pass-through connector 36 align with the same connection ports of the network multi-fiber connector 22. Thus, the connection ports P1 through P12 of the pass-through connector 36 align with and are optically coupled with the connection ports P1 through P12 of the network connector 22. Because of this alignment, no optical signals pass through the connection ports P1, P2, P11, and P12 of the pass-through connector 36, and, accordingly, no optical signal is passed to the optical fibers F1, F2, F11, and F12 of the segment of the branch cable 20 routed between the optical connection terminals 118. This is shown in FIG. 3 by the dotted lines for the optical fibers F1, F2, F11 and F12. The optical fibers that pass through to the next optical connection terminal 118, re-align to "close the gap" that resulted by using the four middle optical fibers. Thus, the optical fibers that then constitute the four middle optical fibers, being the optical fibers designated as F5, F6, F7, and F8 in the next optical connection terminal 118, may be used for connection to the adapters 34 at each drop port 28 of the next optical connection terminal 118. In other words, the next optical connection terminal 118 may be configured in the same manner.

Figure 4:
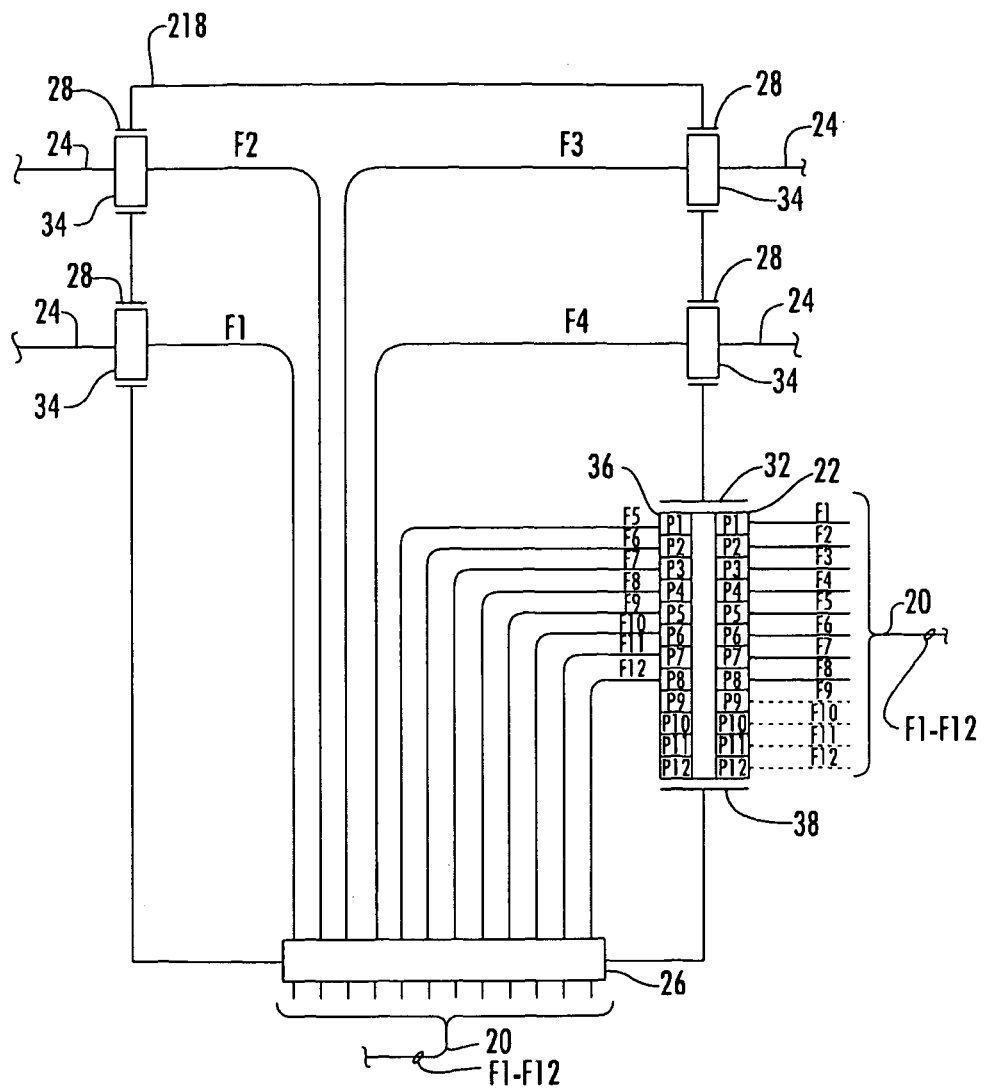
FIG. 4 is a schematic diagram of an optical connection terminal comprising four drop ports and a pass-through port operable for optically coupling predetermined ones of a plurality of optical fibers each to a drop cable based on an exemplary form of a port mapping scheme, according to an exemplary embodiment.

FIG. 4 illustrates another exemplary embodiment of a port mapping scheme similar to FIG. 3 but with different optical fibers optically coupled via the drop ports 28 and the pass-through port 32. In FIG. 4, the optical fibers designated as F1, F2, F3, and F4 of the branch cable 20 route to the drop ports 28 and optically couple to drop cables 24 via the drop ports 28 and the adapters 34 seated in the drop ports 28. The optical fibers designated F5 through F12 route to the pass-through port 32 and connect to the ports P1 through P8, respectively, of the pass-through connector 36 seated in the multi-fiber adapter 38 in the pass-through port 32. Because of the port alignment of the pass-through connector 36 and the network connector 22, the optical fibers F5 through F12 also optically couple to the connector ports P1 through P8 of the network connector 22. The optical fibers designated as F1 through F8 of the branch cable 20 extending between optical connection terminals connect to the connector ports P1 through P8 on the network connector 22 and, therefore, carry optical signals, while the optical fibers F9 through F12 may not carry any optical signals. This is illustrated in FIG. 4 by the dotted lines for the optical fibers F9 through F12. The optical fibers F1, F2, F3, and F4 may be connected to the adapters 34 at the drop port 28 of the next optical connection terminal 218.

Figure 5:
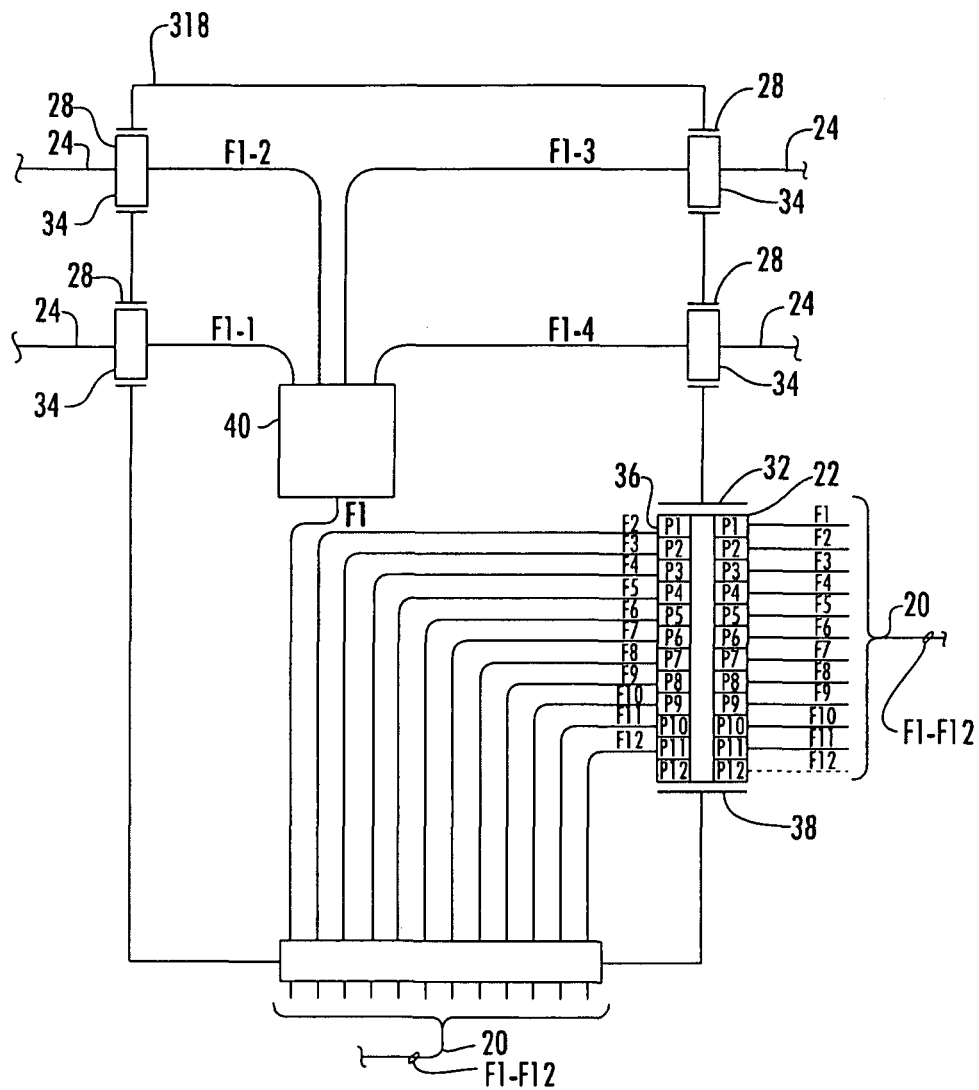
FIG. 5 is a schematic diagram of an optical connection terminal comprising a splitter, four drop ports and a pass-through port operable for optically coupling predetermined ones of a plurality of optical fibers each to a drop cable based on an exemplary form of a port mapping scheme, according to an exemplary embodiment.
Figure 6:
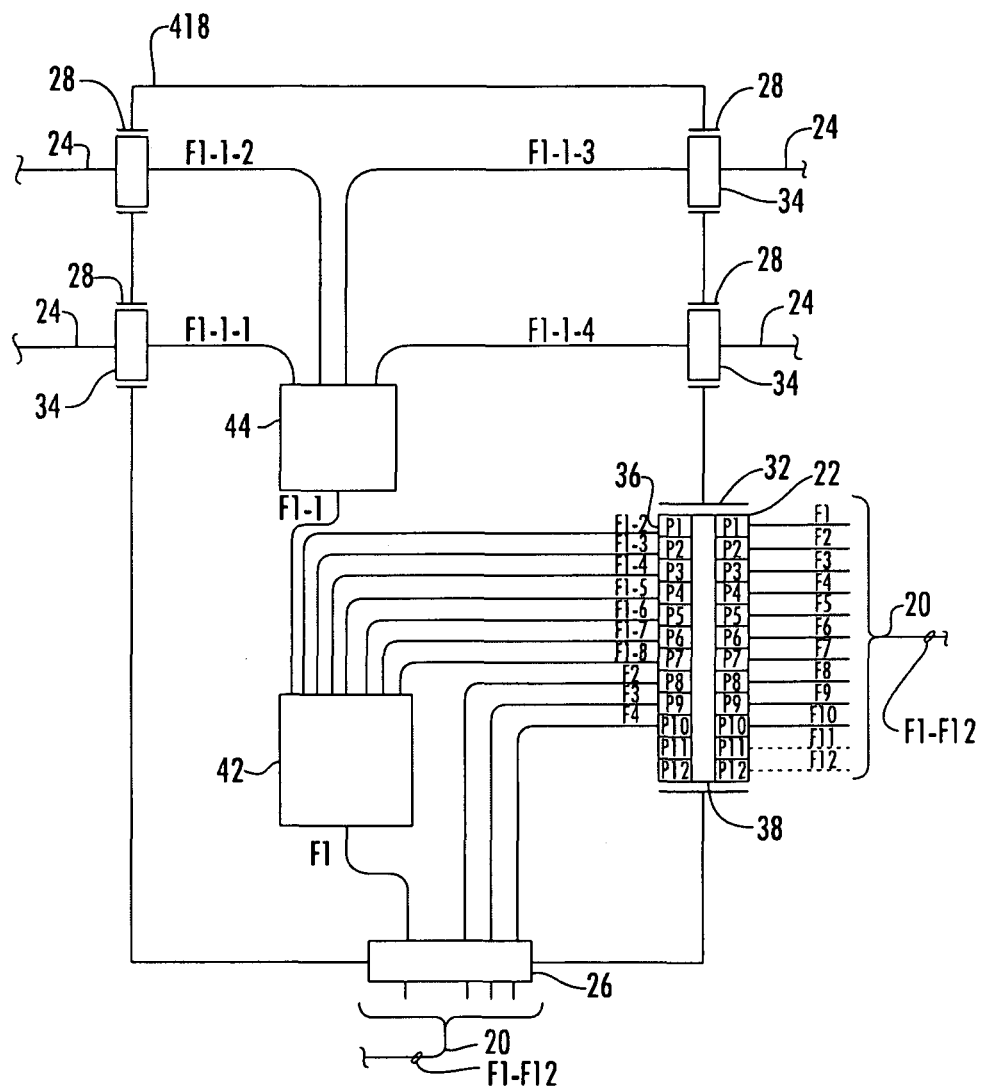
FIG. 6 is a schematic diagram of an optical connection terminal comprising a first tier splitter, a second tier splitter, four drop ports and a pass-through port operable for optically coupling predetermined ones of a plurality of optical fibers each to a drop cable based on an exemplary form of a port mapping scheme, according to an exemplary embodiment.

Other exemplary embodiments of optical connection terminals may be configured with splitters with the port mapping schemes. FIGS. 5 and 6 illustrate exemplary embodiments of such optical connection terminals. In FIG. 5 an exemplary embodiment of an optical connection terminal 318 in accordance with the present invention is shown. The optical connection terminal 318 shown in FIG. 5 is similar to the optical connection terminals 118 and 218 depicted in FIGS. 3 and 4, and, therefore, like components will not be discussed again with reference to FIG. 5. In the exemplary embodiment illustrated in FIG. 5, the optical connection terminal 318 includes a splitter 40. Although, only one splitter 40 is shown in this embodiment, it should be understood that multiple splitters 40 may be included.

In this embodiment, the splitter 40 may be a 1×4 splitter in that one optical signal input to the splitter 40 may be split into four optical signals output from the splitter 40. Please note that since the optical signals may travel in both directions, the operation of the splitter 40 may be viewed from the reverse optical signal direction, in which case four optical signals input to the splitter 40 may be coupled into one optical signal output from the splitter 40. One optical fiber, indicated in FIG. 5 as F1 from the branch cable 20 comprising twelve optical fibers, optically couples to the splitter 40. The other optical fibers of the branch cable 20, being the optical fibers F2 through F12, are routed to the pass-through connector 36. Four first split optical fibers indicated in FIG. 5 as F1-1, F1-2, F1-3, and F1-4 output from the splitter 40. Each of the first split optical fibers that output from the splitter 40 may be pre-connectorized and route to a drop port 28 and optically couple to a drop cable via the drop port 28 and the adapter 34 seated in the drop port 28.

The optical fibers designated as F2 through F12 route to the pass-through port 32 and optically couple with the connection ports P1 through P11, respectively, of the pass-through connector 36. Thus, the connection port P12 of the pass-through connector 36 does not have an optical fiber connected to it. Therefore, no optical signal will pass through the connection port P12 of pass-through connector 36. Because no optical fibers connect to the connection port P12 of the pass-through connector 36, there is no optical signal on the connection port P12 of the network connector 22 and, thus no optical signal optically couples to the optical fiber F12 of the segment of the branch cable 20 which extends to the other optical connection terminals 318. In FIG. 5 this is shown by the dotted lines for the optical fiber F12.

In this port mapping scheme then each optical fiber of the branch cable 20 may optically couple four drop cables 24, one optical fiber for each optical connection terminal 318. A branch cable 20 comprising twelve optical fibers extended from the mid-span access location 14 may optically couple to twelve optical connection terminals 318 in series, with each optical connection terminal 318 serving as an optical coupling point for four drop cables 24. Therefore, the branch cable 20 may optically couple the optical fibers of forty-eight drop cables 24 to twelve optical fibers of the distribution cable 12 with four drop cables optically coupled to each optical fiber of the distribution cable 12.

FIG. 6 illustrates a diagrammatic representation of the optical connection terminal 418 configured having another exemplary embodiment of a port mapping scheme. In FIG. 6 first tier and second tier splitters 42, 44, respectively, are depicted. First tier splitter 42 is a 1×8 splitter and second tier splitter 44 is a 1×4 splitter. As shown in FIG. 6, the branch cable 20 may have four optical fibers. The optical fiber designated as F1 in the branch cable 20 optically couples to the first tier splitter 42. The first tier splitter 42 splits the optical signal carried by the optical fiber designated as F1 into eight optical signals each of which may be carried by individual first split optical fibers output from the first tier splitter 42 as shown. One first split optical fiber designated as F1-1 outputs from the first tier splitter 42 and routes to and optically couples with the second tier splitter 44. The other seven first split optical fibers designated as F1-2, F1-3, F1-4, F1-5, F1-6, and F1-7 output from the first tier splitter 42 and route to the pass-through port 32 and optically couple with the connection ports P1, P2, P3, P4, P5, P6, and P7, respectively, of the pass-through connector 36. The optical fibers designated as F2, F3, and F4 of branch cable 20 route to the pass-through port and optically couple with the connection ports P8, P9, and P10, respectively, pass-through connector 36. Four second split optical fibers designated as F1-1-1, F1-1-2, F1-1-3, F1-1-4 output from the second tier splitter 44 and may be pre-connectorized. Each of the second split optical fibers F1-1-1, F1-1-2, F1-1-3, F1-1-4 route to a drop port 28 and optically couple to a drop cable 24 via the drop port 28 and the adapter 34 seated in the drop port 28.

Figure 7:
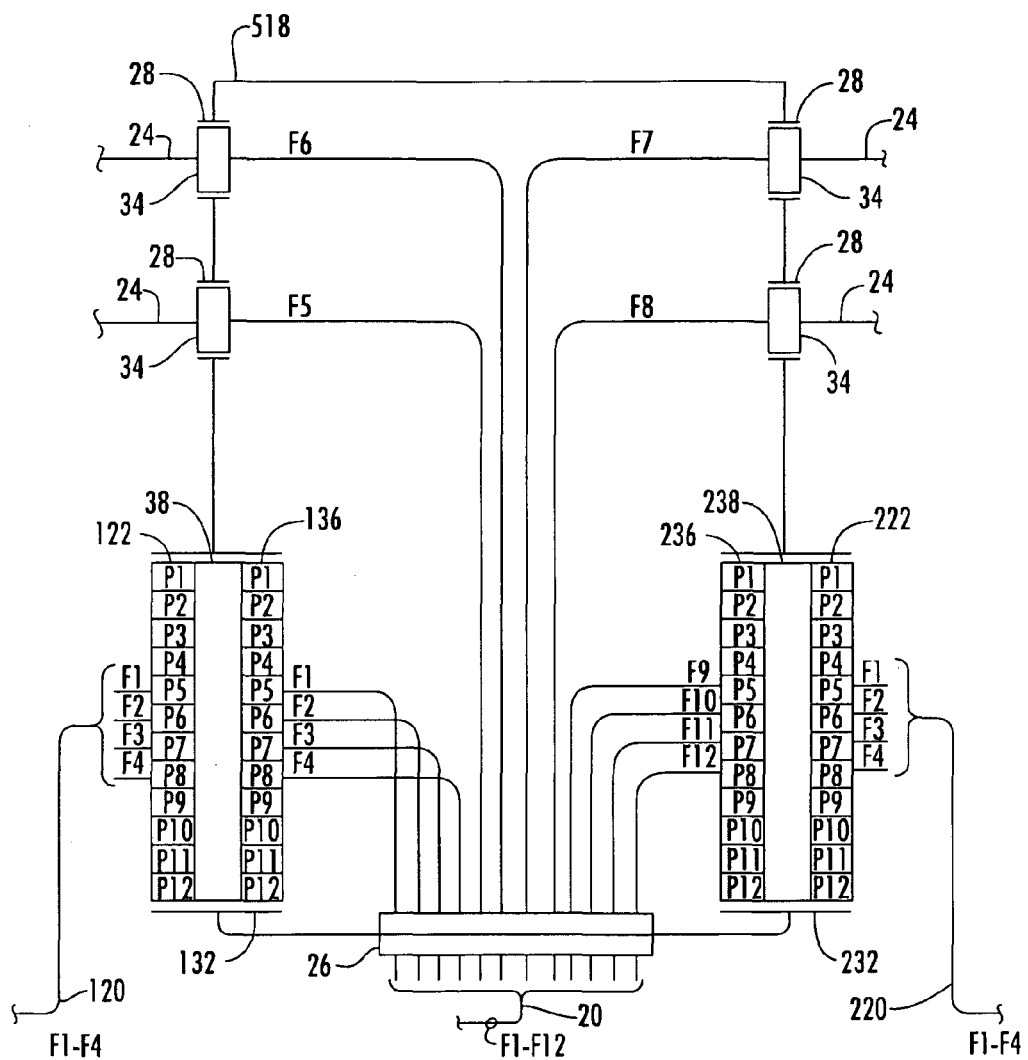
FIG. 7 is a schematic diagram of an optical connection terminal comprising four drop ports and two pass-through ports operable for optically coupling predetermined ones of a plurality of optical fibers each to a drop cable based on an exemplary form of a port mapping scheme, according to an exemplary embodiment.

FIG. 7 is a schematic diagram showing optical connection terminal 518 that may be used as a sub-branching point in a multi-level fiber optic network architecture. As shown in FIG. 7, the optical fibers designated F5, F6, F7, and F8 each route to a separate adapter 34 with each adapter 34 seated in a separate drop port 28, in the same manner as was described with respect to FIG. 3. The other optical fibers in the branch cable 20, being the optical fibers F1, F2, F3, F4, F9, F10, F11, and F12, route to two separate pass-through ports 132, 232. The optical fibers designated as F1, F2, F3, and F4 optically couple with connection ports P5, P6, P7, and P8 on pass-through connector 136. The optical fibers designated as F9, F10, F11, and F12 optically couple with and map to connection ports P5, P6, P7, and P8 on pass-through connector 236.

The pass-through connectors 136, 236 connect to the adapters 138, 238, respectively, which are seated in the pass-through ports 132, 232. Sub-branch cables 120, 220 each may comprise four optical fibers and optically couple to the adapters 138, 238 through the network connectors 122, 222, respectively. Thus, the optical fibers designated F1, F2, F3, and F4 of the branch cable 20 optically couple with the optical fibers designated as F1, F2, F3, and F4 of the sub-branch cable 120. And, the optical fibers designated F9, F10, F11, and F12 of the branch cable 20 optically couple with the optical fibers designated as F1, F2, F3, and F4 of the sub-branch cable 220.

Figure 8:
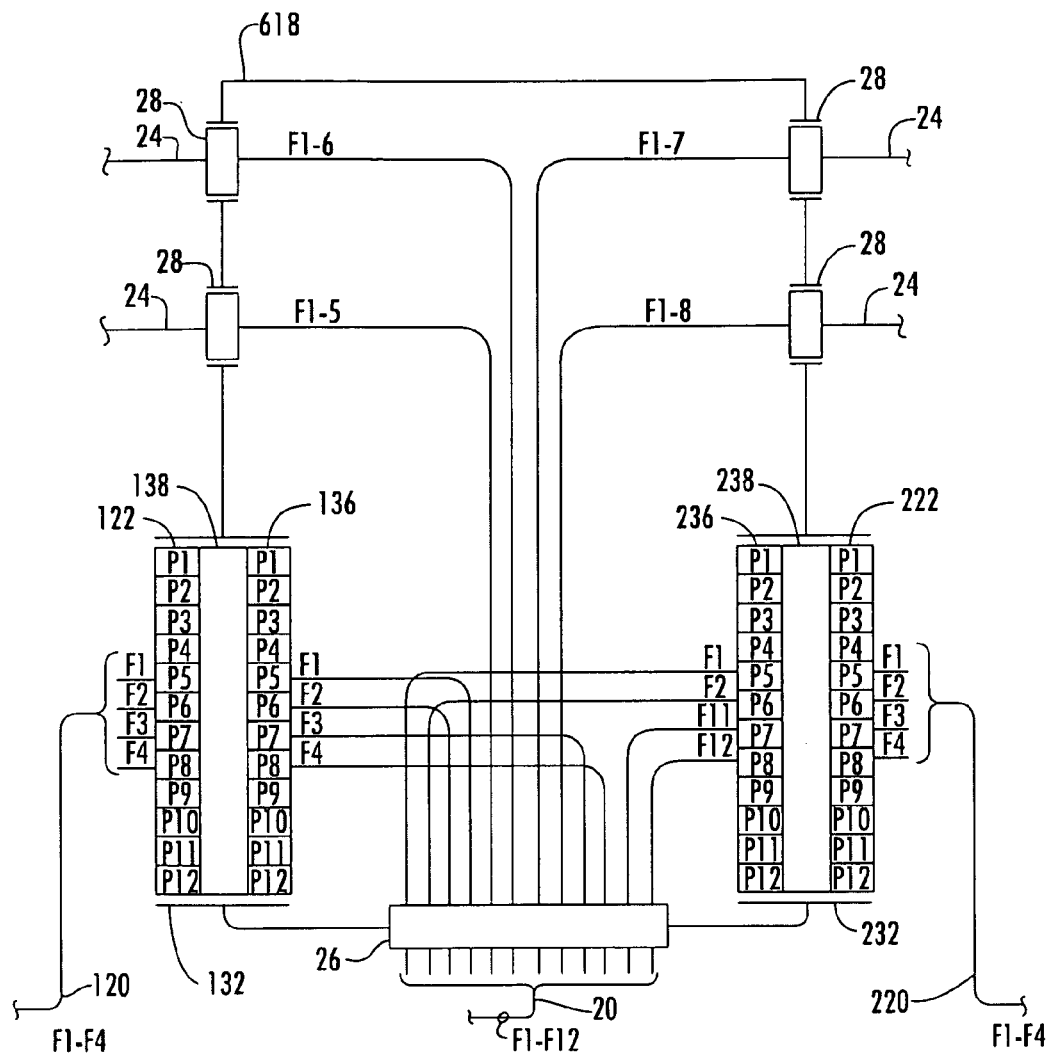
FIG. 8 is a schematic diagram of an optical connection terminal comprising four drop ports and two pass-through ports operable for optically coupling predetermined ones of a plurality of optical fibers each to a drop cable based on an exemplary form of a port mapping scheme, according to an exemplary embodiment.

FIG. 8 shows another exemplary embodiment of an optical connection terminal 618 similar to the optical connection terminal 518 depicted in FIG. 7. In FIG. 8, the optical fibers F3, F4, F9 and F10 route to pass-through port 132 and optically couple with the connection ports P5, P6, P7, and P8 of the pass-through connector 136 seated in the pass-through port 132. And, the optical fibers F1, F2, F11, and F12 route to the pass-through port 232 and optically couple with the connection ports P5, P6, P73, and P8 of the pass-through connector 236. The optical connection terminals 518, 618 shown in FIGS. 7 and 8, in addition to providing optical coupling between the distribution cable 12 and the drop cables 24, may be used as a sub-branching point separating the branch cable 20 into sub-branch cables 120, 220 to optically couple to the other optical connection terminals in the sub-branches. Additionally, the port mapping schemes will allow for further configuring of the optical connection terminals and other fiber optic network devices in a multi-level fiber optic network architecture as will be further described below.

Figure 9:
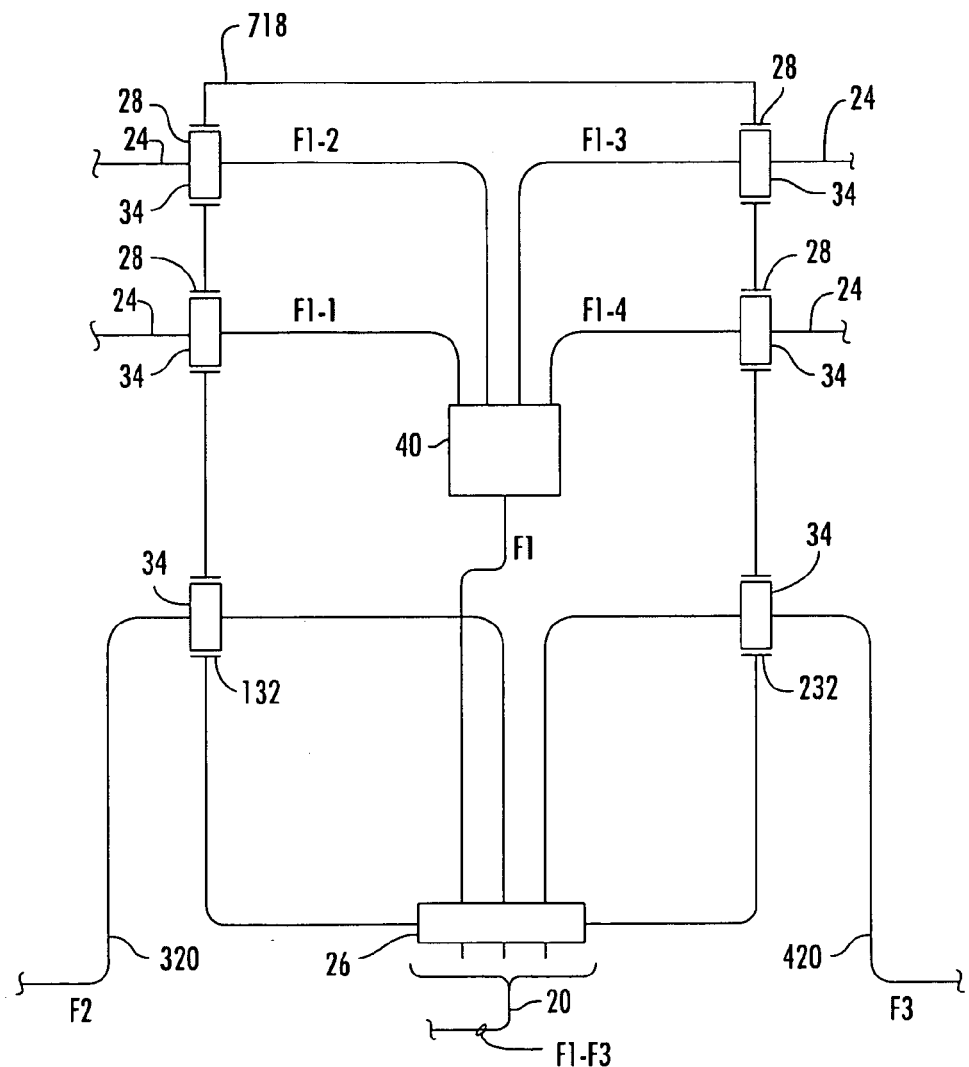
FIG. 9 is a schematic diagram of an optical connection terminal comprising a splitter, four drop ports, and two pass-through ports operable for optically coupling predetermined ones of a plurality of optical fibers each to a drop cable based on an exemplary form of a port mapping scheme, according to an exemplary embodiment.

Another embodiment of an optical connection terminal that may be used as a sub-branching point in a multi-level network architecture is shown in FIG. 9. FIG. 9 depicts an optical connection terminal 618 comprising the splitter 40. The splitter 40 provides a 1×4 split of optical signals. As shown in FIG. 9, branch cable 20 has three optical fibers. One of the optical fibers, designated as F1, routes to and optically couples with the splitter 40. The optical signal carried by the optical fiber F1 is split into four optical signals. Each optical signal is carried by an optical fiber designated in FIG. 9 as first split optical fibers F1-1, F1-2, F1-3, and F1-4, which routes to drop ports 28.

The optical fibers designated as F2 and F3 of the branch cable 20 route to pass-through ports 132, 232, respectively. A fiber adapter 34 seated in the pass-through ports 132, 232 is operable for optically coupling sub-branch cables 120, 220 to optical fibers F2 and F3, respectively. Each sub-branch cable 120, 220 may then extend to the optical connection terminals located in another level of the multi-level fiber optic network. The optical connection terminals located in the other level may comprise a splitter 40 similar to optical connection terminal 618. Further, the optical fiber in the sub-branch cables 120, 220 may optically couple to the splitter 40 in the optical connection terminals in the other level of the multi-level fiber optic network. And, the optical fibers output from the splitter 40 may route to drop ports 28 in the same manner as optical connection terminal 618 shown in FIG. 9.

Fiber Optic Network Architectures Employing Optical Connection Terminals with Port Mapping Schemes Several exemplary embodiments of optical connection terminals configured with port mapping schemes were described above. Following are exemplary embodiments of fiber optic network architectures comprising optical connection terminals configured with a port mapping scheme. Because of the port mapping schemes, optical connection terminals may be used in varied combinations to provide desired network architectures. In doing so, the specific circumstances or requirements of the service provider may be addressed to cost effectively and efficiently extend the fiber optic network to subscribers. Examples of such network architectures are illustrated in FIGS. 10-14, which illustrate just a few possible fiber optic network architectures. It will be apparent to one having ordinary skill in the art, having had the benefit of the present disclosure, that the present invention may be practiced in other embodiments of network architectures that depart from the specific details disclosed herein.

Turning now to FIGS. 10-14, schematic illustrations of a network architectures utilizing port mapping schemes according to exemplary embodiments are shown. The figures depict fiber optic network architectures in series and multi-level distributed arrangements of optical connection terminals. The use of certain optical connection terminals is only intended to facilitate description of the embodiments shown in FIGS. 10-14, and is not intended to limit the type of optical connection terminals or the port mapping schemes that may be employed. As such, other optical connection terminals and port mapping schemes may be used.

FIGS. 10-14 each depict a fiber optic network comprising a fiber optic distribution cable 12 and a mid-span access location 14. The mid-span access location 14 provides a branch point for one or more branches of the fiber optic network. The mid-span access location 14 may be factory-prepared with preterminated or pre-connectorized optical fibers at predetermined branch points on a distribution cable for a pre-engineered fiber optic network. Alternatively, the mid-span access location 14 may be field-prepared at a branch point formed on a previously deployed distribution cable. The mid-span access location 14 may be enclosed and protected from exposure to the environment by a conventional closure, by a molded structure including one which may be formed by an overmolding process, a combination of enclosure and molded structure, or by any other suitable structure or process. Thus, the distribution cable 12 may be factory-prepared with at least one mid-span access location 14 for providing access to at least one optical fiber of the distribution cable 12 in a fiber optic network.

Although only one mid-span access location 14 may be shown, the distribution cable 12 may have a plurality of mid-span access locations 14 at branching points spaced along the length of the distribution cable 12, each providing access to at least one of the optical fibers of the fiber optic network. The branch cable 20 may optically couple to the mid-span access 14 location using a network connector 22. The branch cable 20 may have a fiber count equal to or greater than the number of drop cables 24 to be optically coupled to the optical connection terminals. However, due to the port mapping scheme and/or the particular network architectures, it is not necessary that the branch cable 20 have a fiber count equal to or more than the number of drop cables 24. Additionally, the optical connection terminals are configured based on the port mapping scheme in such a manner to predetermine which optical fibers of the branch cable 20 route to and optically couple with which drop port 28 and pass-through port 32. In other words, predetermined ones of the drop ports 28 and the pass-through ports are operable for optically coupling respective predetermine ones of the optical fibers. Or, stated in an alternative manner, predetermined ones of the optical fibers route to and optically couple with drop cable via respective predetermined ones of the drop ports 28 and the pass-through ports 32.

Figure 10:
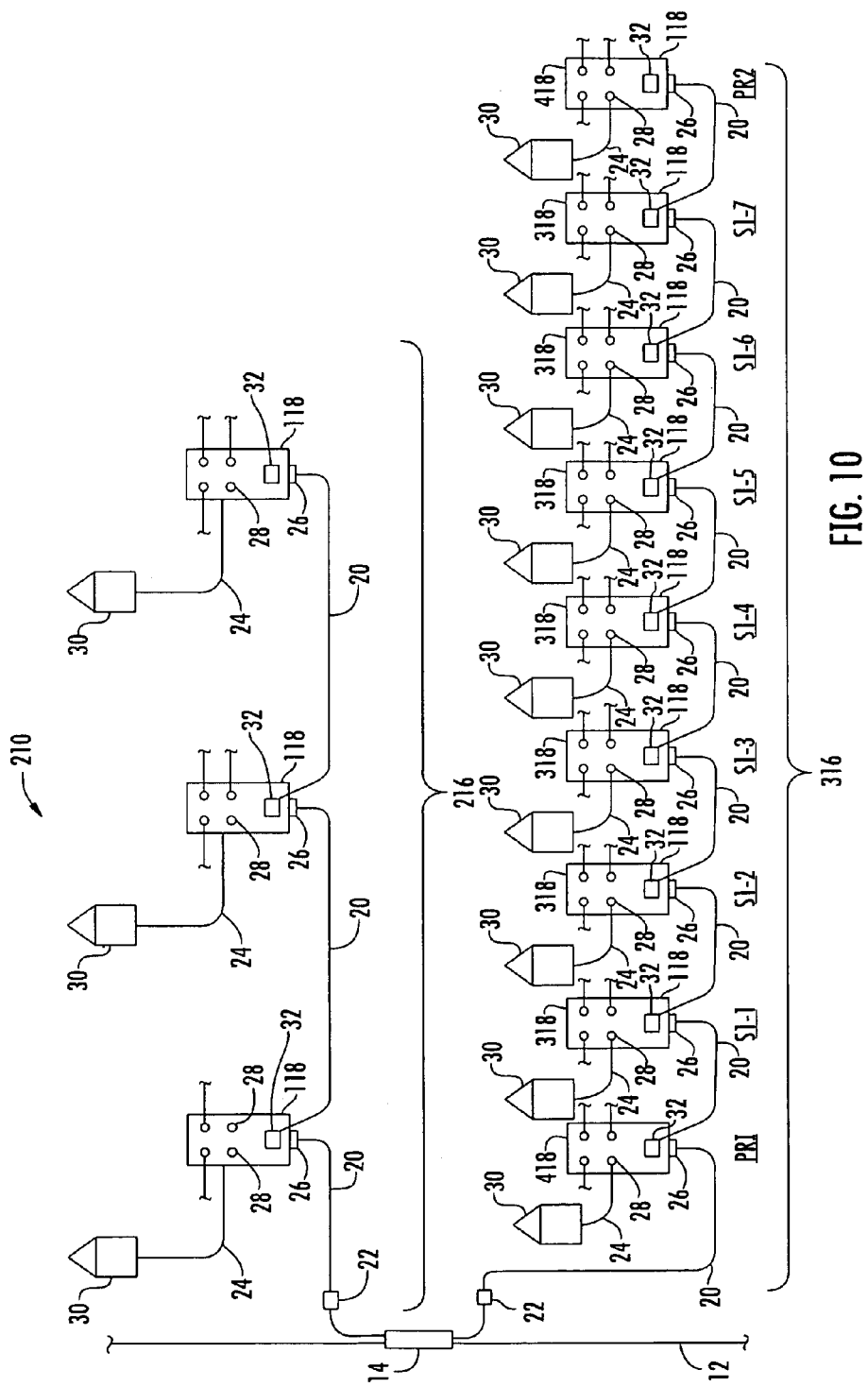
FIG. 10 is a schematic diagram of a portion of a fiber optic network comprising a distribution cable having a mid-span access location serving as a branching point for two branches, each of the branches comprising multiple optical connection terminals in series arrangement, according to an exemplary embodiment.

Turning now to FIG. 10, a fiber optic network 210 is depicted. The fiber optic network 210 has two branches 216, 316 with optical connection terminals arranged in series. The branch 216 comprises three optical connection terminals 118. The optical connection terminal 118 was depicted in FIG. 3 and described and discussed above with reference to FIG. 3. The branch 316 comprises optical connection terminals 318, 418. The optical connection terminal 318 was depicted in FIG. 5 and described and discussed above with reference to FIG. 5. And the optical connection terminal 418 was depicted in FIG. 6 and described and discussed above with reference to FIG. 6.

The branch cable 20 in the branch 216 may comprise twelve optical fibers which equal the number of drop cables 24 in branch 216. The branch 316 comprises multiple optical connection terminals 318, 418 in series. However, the branch cable 20 in branch 316 may have as few as four optical fibers. This is due to the port mapping scheme employed in the optical connection terminals 318, 418 as will be explained in more detail below.

Figure 11:
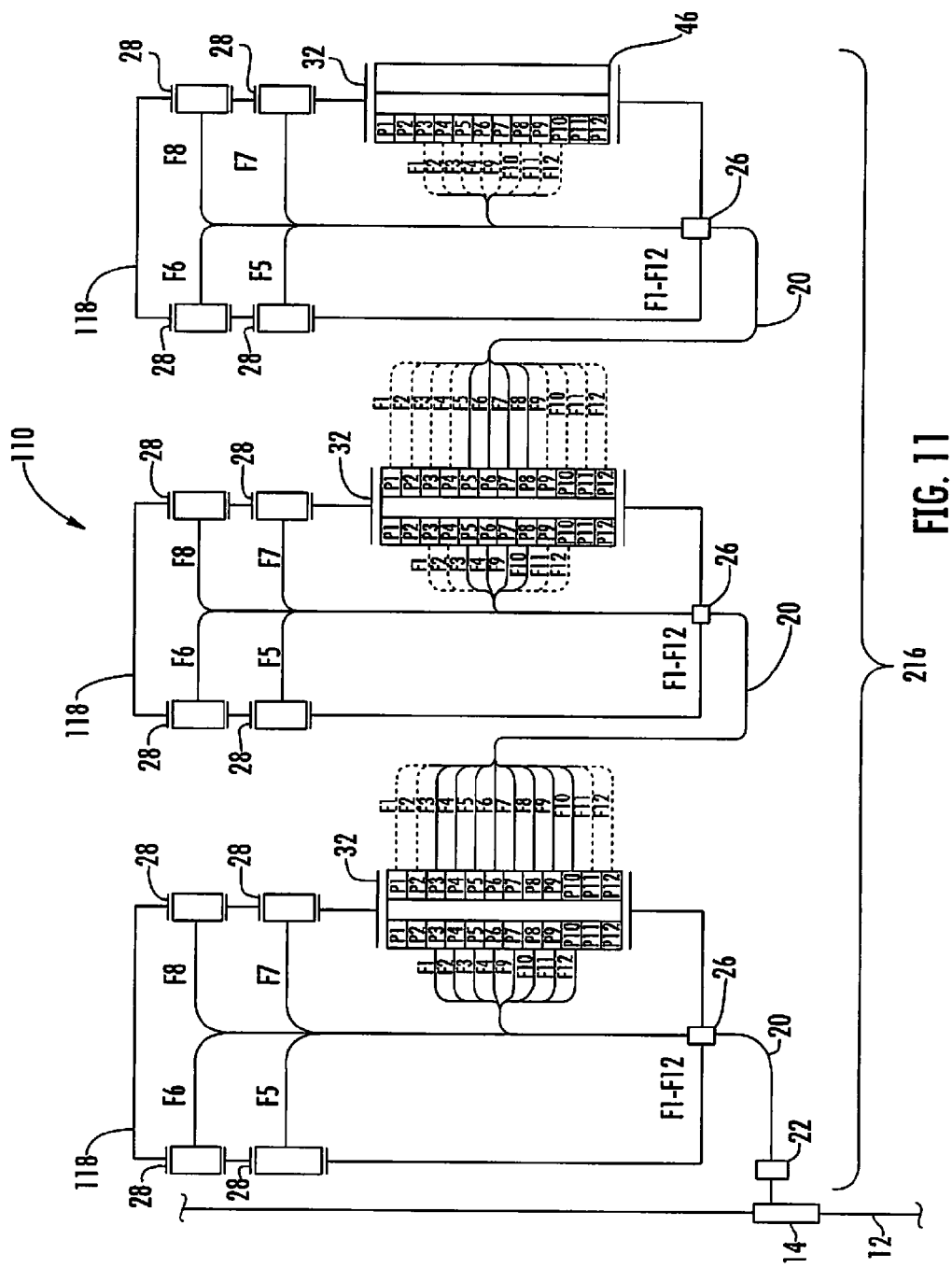
FIG. 11 is a schematic diagram illustrating the detail of the optical coupling of the optical connection terminals in one of the branches of a the portion of the fiber optic network depicted in FIG. 9, according to an exemplary embodiment.

Referring now to branch 216 shown in FIGS. 10 and 11, each optical connection terminal 118 has a branch cable port 26 provided through an exterior surface or wall. A segment of the branch cable 20 enters each optical connection terminal 118 at the respective branch cable port 26. The optical connection terminal 118 may have any shape and may accommodate any number of drop ports 28 arranged in any manner. In the embodiment shown each optical connection terminal 118 is shown as having four drop ports 28 thus providing a total of twelve drop connector ports in the branch 216.

As described above with reference to FIG. 3, using the port mapping scheme of this embodiment, the optical fibers F5, F6, F7, and F8 of branch cable 20 are individually pre-connectorized and each route to a separate adapter 34 seated in a separate drop port 28 in each of the three optical connection terminals 118. The other optical fibers in branch cable 20, being the optical fibers F1, F2, F3, F4, F9, F10, F11, and F12, route to the pass-through port 32 and optically couple to the connection ports P3 through P10, respectively, of pass-through connector 36. Because of this port mapping scheme, no optical fibers optically couple to the ports P1, P2, P11, and P12 of the pass-through connector 36 of each optical connection terminal 118.

The port mapping scheme in this embodiment results in the number of active optical fibers being reduced by four in each successive optical connection terminal 118. As shown in FIG. 11, in the segment of the branch cable 20 entering the second in series optical connection terminal 118, only the optical fibers F3 through F10 are active, while the optical fibers F1, F2, F11 and F12 are inactive. In other words, the optical fibers F1, F2, F11 and F12 do not carry any optical signals due to the four fibers routed to the drop ports 28 in the first in series optical connection terminal 118. Continuing on in this same manner, in the segment of the branch cable 20 entering the third in series optical connection terminal 118, only the optical fibers F5 through F8 are active, while the optical fibers F1, F2, F3, F4, F9, F10, F11, and F12 are inactive. The inactive optical fibers in each optical connection terminal 118 are shown by dotted lines. Since in the third in series optical connection terminal 118, none of the optical fibers routed to the pass-through port 32 carry any optical signals, another segment of the branch cable 20 may not need to be connected externally to the pass-through port 32. Instead a cap 46 may be installed on the pass-through port 32 on the outside of the optical connection terminal 118.

In the embodiment depicted in FIG. 11, one optical connection terminal design may be used interchangeably for any of the optical connection terminals 118 in the series arrangement of branch 216, limiting different part numbers and minimizing complexity and installation skills. This allows the optical connection terminal 118 to be pre-engineered and stocked as one universal type of optical connection terminal for use in the branch 216. Thus, the optical connection terminal 118 may be provided complete with the branch cable 20 having a network connector 22 on one end, and the other end entering the branch cable port 26 with the optical fibers routed to the drop ports 28 and pass-through port 32 as described above. Alternatively, the end entering the branch cable port 26 may also have a connector attached to it, and connected to an adapter in a similar manner to that of the pass-through port 32. In either case, the optical connection terminal 118 may be provided as a plug and play terminal. Further, the branch 216 may be pre-engineered with the optical connection terminals 216 already arranged in series in the factory and only connecting to and thereby optical coupling with, the distribution cable 12 at the mid-span access point 14 and the drop cables 24 to the drop ports 28 may be needed.

Also, although not shown in FIGS. 10 and 11, the segment of the branch cable 20 in branch 216 extended to the last in series, in FIGS. 10 and 11 the third in series, of optical connection terminal 118 may have four optical fibers, all of which are active, meaning carrying optical signals. The optical fibers may each route to a separate adapter 34 with each adapter 34 seated in a separate drop port 28. Since there are no other optical fibers in that segment of the branch cable 20 there would be no need for a pass-through port 32 and, thus, it may not be included. As such, the third in series optical connection terminal may just have four drop ports 28 with no pass-through port 32.

Further, although the optical connection terminal 118 shown in FIGS. 10 and 11 has four drop ports 28 and one pass-through port 32, optical connection terminals with any number of drop ports 28 and pass-through ports 32 may be used as one or more of the optical connection terminals in the series in branch 216. For example, if the installation warrants, only two optical connection terminals may be required with the second optical connection terminal in the series comprising eight drop ports 28. In such a case, the active optical fibers of the branch cable 20, which are designated as F3 through F10, each may route to a drop port 28. In effect then, the optical connection terminal having eight drop ports 28 may be the last in the series of branch 216 as all active optical fibers of the branch cable 20 will have been connected to drop ports 28, either in the first in series optical connection terminal 118 or second optical connection terminal 118.

Additionally or alternatively, one or more of the optical connection terminals may be another design, for example, optical connection terminals 218, 318, or other design, or any combination of optical connection terminals. As an example, the optical connection terminal 318 of FIG. 5 may be included in the series in the branch 216. In such case, each optical fiber of the branch cable 20 may be split into four individual first split optical fibers which may then each route to an adapter 34 seated in the drop port 28. In this manner, one optical fiber of the twelve fiber branch cable 20 may optically couple four drop cables 24, and, thereby, four subscriber premises 30, to the distribution cable 12. As such, a twelve fiber branch cable 20 extended from the mid-span access location 14 may optically couple to twelve optical connection terminals 318 in series, with each optical connection terminal 318 serving as an optical coupling point for four drop cables 24. Therefore, the branch cable 20 may optically couple the optical fibers of forty-eight drop cables 24 to twelve optical fibers of the distribution cable 12 with four drop cables optically coupled to each optical fiber of the distribution cable 12.

Figure 12:
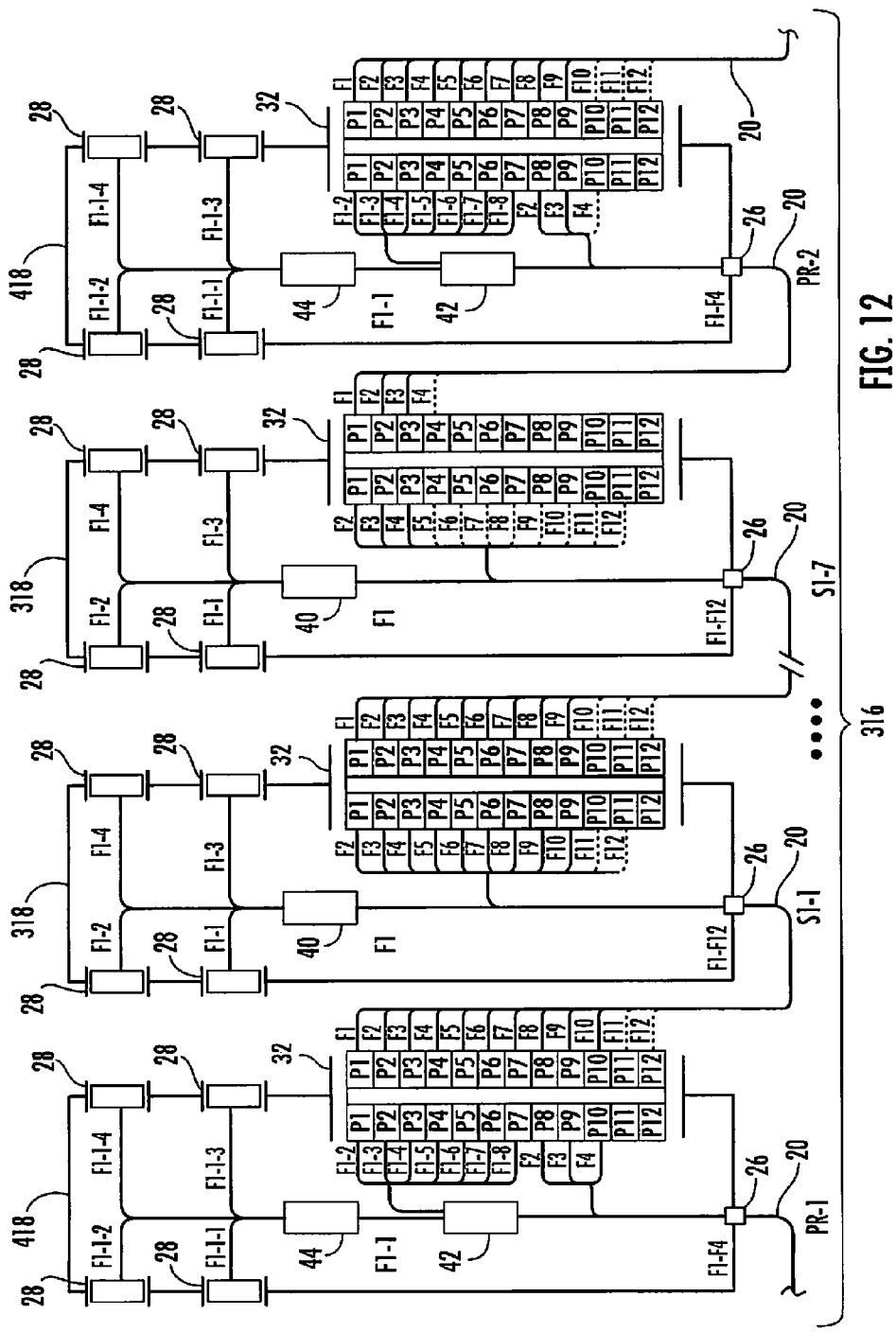
FIG. 12 is a schematic diagram illustrating the detail of the optical coupling of the optical connection terminals in one of the branches of a portion of the fiber optic network depicted in FIG. 9, according to an exemplary embodiment.

As another example, the branch 316 comprises the optical connection terminal 418 shown in FIG. 6 used as a primary or first optical connection terminal in a series with the optical connection terminal 318 shown in FIG. 5 used as secondary optical connection terminals in the series. FIGS. 10 and 12 are diagrammatic illustration of a branch 316 in which the optical connection terminal 418 and more than one of the optical connection terminals 318 are arranged in series. In this embodiment, a branch cable 20 having four optical fibers optically couples to the distribution cable 12 at the mid-span access location 14 and extends to the first primary optical connection terminal 418 in the branch 316. The first primary optical connection terminal 418 is designated as PR1 in FIGS. 10 and 12. As described above with respect to FIG. 6, in the optical connection terminal 418 the optical fiber F1 optically couples to the first tier splitter 42. In the first tier splitter 42, the optical signal in the optical fiber F1 is split into eight optical signals, each optical signal carried by a separate optical fiber, which may be considered a first split optical fiber. One of the first split optical fibers optically couples to the second tier splitter 44. In the second tier splitter 44, the optical signal in the optical fiber is split into four optical signals. Each of the optical signals is carried on a separate optical fiber, which may be considered a second split optical fiber. Each second split optical fiber output from the second tier splitter 44 may route to one or more drop ports 28 and optically couple with one or more drop cables 24. The other seven first split optical fibers from first tier splitter 42 and the optical fibers F2, F3, and F4 of the branch cable 20 route to the pass-through port 32 and optically couple to certain of the ports in the pass-through connector 36 seated in pass-through port 32, as described above with respect to FIG. 6.

A segment of branch cable 20 comprising twelve optical fibers extends from the optical connection terminal 418 designated as PR1 to the second optical connection terminal in the series. This may be the optical connection terminal 318 as depicted in FIG. 5, which is designated as S1-1 in FIGS. 10 and 12. In the optical connection terminal 318 designated as S1-1, the optical fiber F1 routes to and optically couples with splitter 40. The optical signal in the optical fiber F1 is split into four signals each carried by a separate first split optical fiber. Each optical fiber may route to one or more drop ports 28 to optically couple with one or more drop cables 24. The optical fibers designated F2-F12 route to the pass-through port 32 and optically couple to certain ports of the pass-through connector 36 seated in the pass-through port 32 as described above with respect to FIG. 5. Because of the port mapping scheme in the optical connection terminal 418 designated as PR1, the optical fibers F11 and F12 of the segment of the branch cable 20 extending to the optical connection terminal 318 designated as S1-1 do not carry any optical signal as indicated by the dotted lines.

In this embodiment, optical connection terminal 318 designated as S1-1 may be arranged in series and connect to optical connection terminal 318 designated as S1-2, and successively thereafter to optical connection terminals 318 designated S3, S4, S5, S6, and S1-7 in the series arrangement. For ease of explanation, only optical connection terminals 318 designated S1-1 and S1-7 are depicted. Due to the port mapping scheme, in each successive optical connection terminal 318 in the series, an additional optical fiber will become inactive, or, in other words, not carry an optical signal. As shown in FIG. 12, the inactive optical fiber may be the highest designated active optical fiber in the previous optical connection terminal 318 in the series. This action continues until none of the optical fibers designated as F5 through F12 are carrying an optical signal as shown by the dotted lines in the last shown optical connection terminal 318 in the series, which is designated as S1-7. In this manner, the optical signal carried in the optical fiber designated as F1 in the segment of the branch cable 20 from the mid-span access location 14, underwent multiple splitting to optically couple four drop cables 24 in each of eight optical connection terminals, one primary optical connection terminal 418 designated as PR1 and seven secondary optical connection terminals 318 designated as S1-1 through S1-7. Thus, the optical fiber designated as F1 in the segment of the branch cable 20 from the mid-span access location 14 may optically couple thirty two drop cables 24.

Similarly, the optical fibers designated as F2, F3, and F4 in the segment of the branch cable 20 extending from the mid-span access location 14 may be split and optically couple to the drop cables 24 in the same manner. As shown in FIG. 12, a four fiber branch cable 20 extends from optical connection terminal 318 designated as S1-7 to optical connection terminal 418 designated as PR2 establishing the primary-secondary series connection again with seven optical connection terminals 318, S2-1 through S2-7. In like manner, the same primary-secondary series connection may be established for optical connection terminals 418 designated as PR3 and PR4. The last optical connection terminal 318 being S4-7. Due to the port mapping scheme shown in FIG. 12, each of the four optical fibers in the segment of the branch cable 20 extending from the mid-span access location 14 may optically couple thirty-two drop cables to an optical fiber of the distribution cable 12. Accordingly, the segment of the branch cable 20 extending from the mid-span access location 14 may optically couple a total of 128 drop cables to the distribution cable 12. Moreover, in the embodiment shown in FIGS. 10 and 12, the branch 316 may be optically coupled to a feeder or transport cable in a manner to obviate the need for a local convergence point or other similar centralized splitter cabinet and, thereby, provide installation, operation and maintenance advantages to the service provider.

Figure 13:
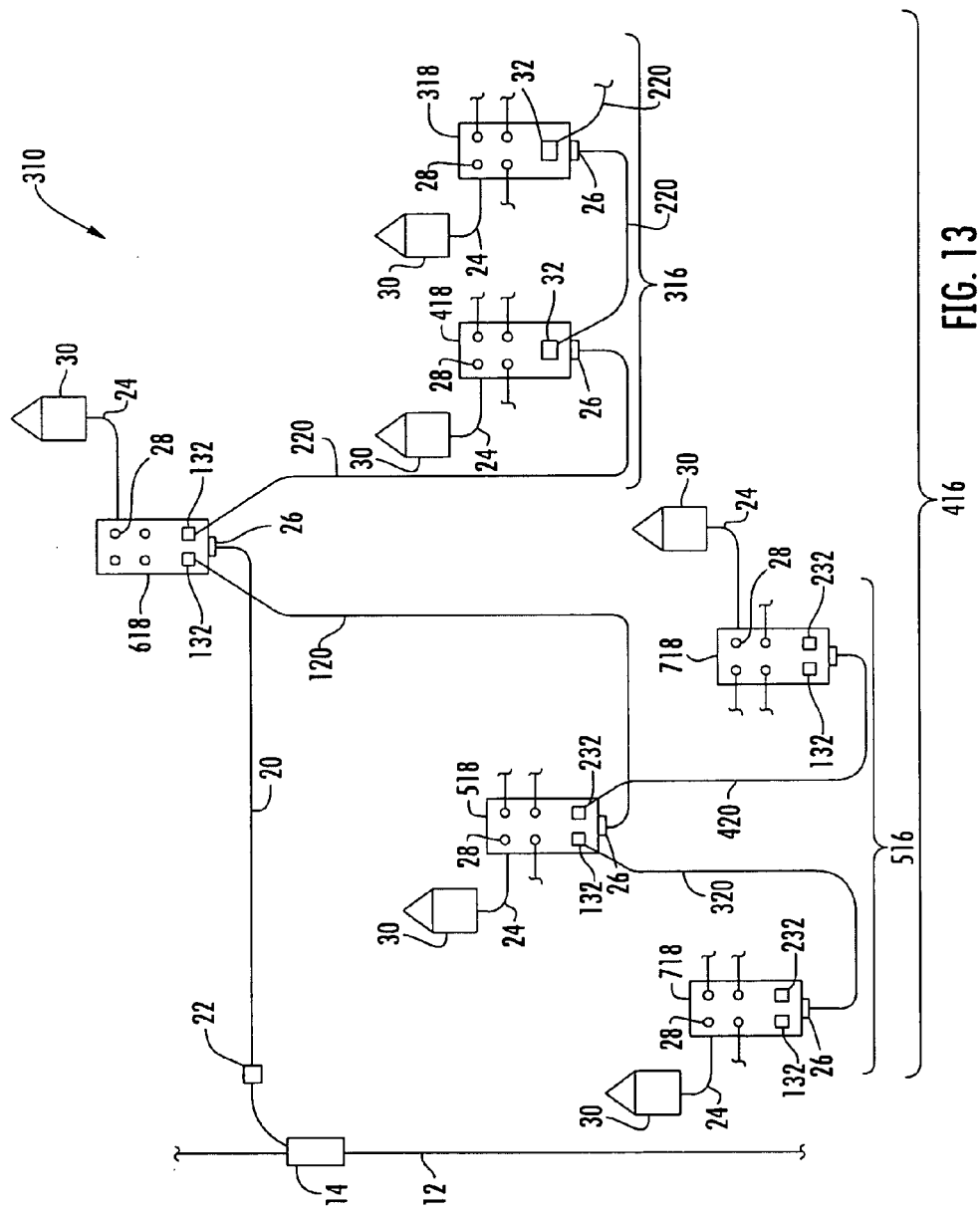
FIG. 13 is a schematic diagram of a portion of a fiber optic network comprising a distribution cable having a mid-span access location serving as a branching point for a branch comprising multiple optical connection terminals in a sub-branching arrangement of a portion of a fiber optic network having a multi-level architecture, according to an exemplary embodiment.

Optical connection terminals 518, 618 also may be included in the branches 216, 316 to provide a combination of series and multi-level network architecture. Conversely, a series network arrangement may be included in a multi-level network architecture. FIG. 13 illustrates a multi-level, distributed, hierarchical architecture in accordance with another exemplary embodiment. FIG. 13 depicts a fiber optic network 310 comprising a distribution cable 12 having a mid-span access location 14 serving as a branching point for branch 416. The branch 416 includes an optical connection terminal 618 at a first level, the optical connection terminals 318, 418, and 518 at a second level, and the optical connection terminals 718 at a third level. The sub-branch 316 is part of the second layer. The sub-branch 516 is at the second and third layers.

The sub-branch 316 may be a series arrangement of optical connection terminal similar to one or both of the branches depicted in FIG. 10. In FIG. 13, the sub-branch 316 is shown comprising two optical connection terminals 318, 418. Sub-branch 516 comprises optical connection terminal 518 as depicted in and described with reference to FIG. 7. Sub-branch 516 further comprises two additional optical connection terminals 718 arrange in a further sub-branch. Therefore, FIG. 13 illustrates a three level architecture from one mid-span access point 14 in the branch 416.

In FIG. 13, a branch cable 20 optically couples to distribution cable 12 at mid-span access location 14 and extends to the optical connection terminal 618. The branch cable 20 optically couples to the distribution cable 12 via the network connector 22. The branch cable 20 enters the optical connection terminal 618 at the branch cable port 26. Two sub-branch cables 120, 220 extend separately from the optical connection terminal 618 to the two optical connection terminals 418, 518 in sub-branches 316, 516, respectively. The two sub-branch cables 120, 220 optically couple to the optical connection terminal 518 through the network connectors 122, 222, respectively, through adapters 138, 238 seated in separate pass-through ports 132, 232, respectively. The sub-branch cables 120, 220 enter the optical connection terminals 318, 418, and 518 at branch cable ports 26, in the manner as depicted in and described with reference to FIGS. 5, 6 and 7, and, therefore, will not be described again. Similarly, the drop cables 24 extend from the optical connection terminal 618, as well as the optical connection terminals 318, 418, 518, 618 and 718 as depicted in and described with reference to FIGS. 5, 6, 7, and 8. Although, in FIG. 13, only one drop cable 24 is shown extending to the subscriber premises 30 from the optical connection terminals 318, 418, 518, 618 and 718, this was just to facilitate the depiction and discussion of the branches and sub-branches shown in FIG. 13, and, therefore, it should be understood that the present invention is not limited to any number of drop cables 24.

As depicted in FIG. 13, sub-branch cables 320, 420 extend from the optical connection terminal 518 to the two optical connection terminals 718 in the sub-branch 516. Although, in FIG. 13 the two optical connection terminals 718 are not shown with sub-branch cables extending therefrom, such sub-branch cables may be included to form another, or fourth level, of the fiber optic network architecture in branch 516. Further, although in FIG. 13 only one mid-span access location 14 is shown, the fiber optic distribution cable 12 may have a plurality of mid-span access locations 14 at branching points spaced along the length of the distribution cable 12, each providing access to at least one of the optical fibers of the fiber optic network. Additionally, the mid-span access location 14 may support more than one branch 416.

Figure 14:
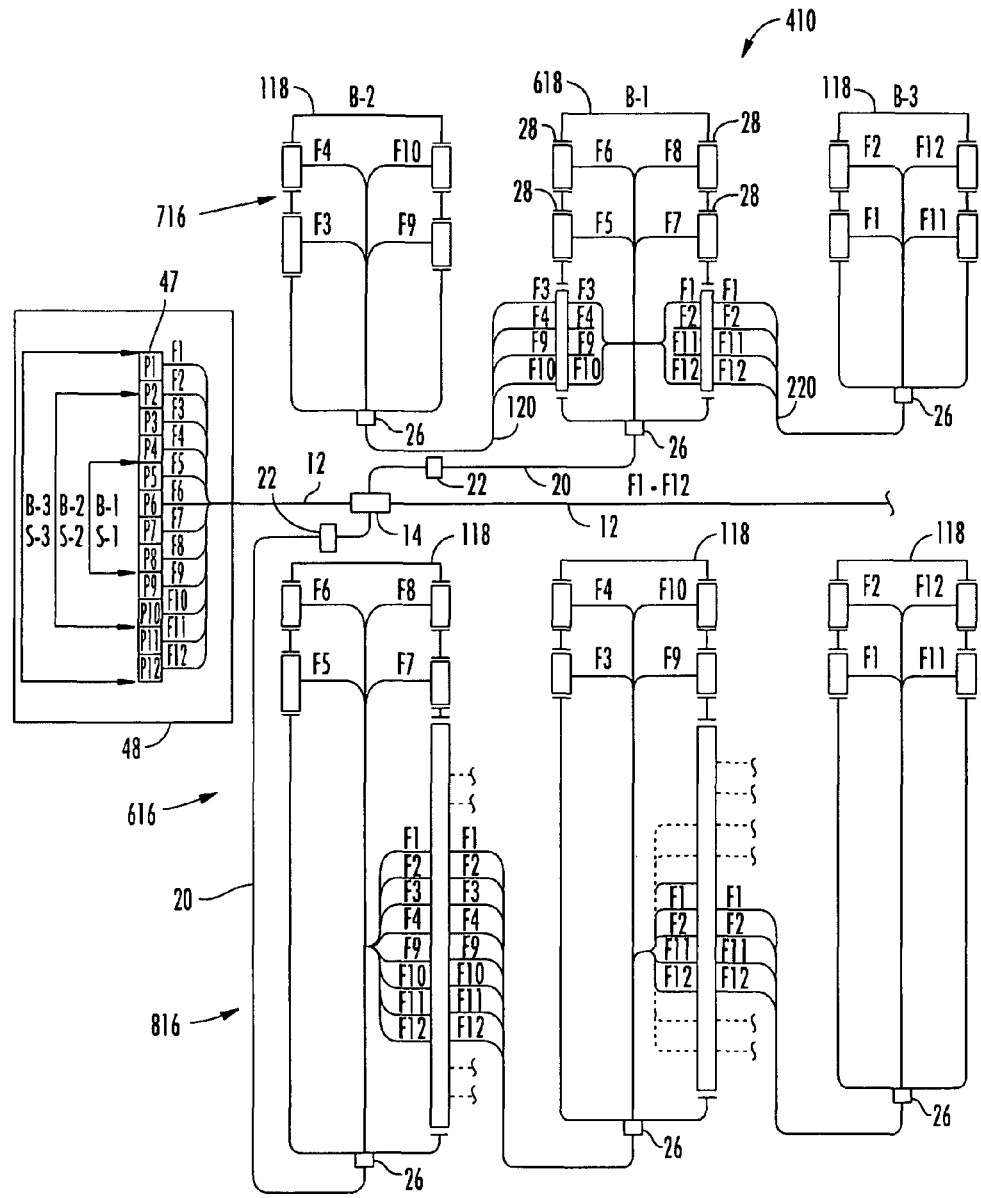
FIG. 14 is a schematic diagram illustrating the detail of the optical coupling of the optical connection terminals and a local convergence point in a portion of a fiber optic network having a multi-level architecture based on an exemplary form of port mapping scheme, according to an exemplary embodiment.

Turning now to FIG. 14, there is shown another example of a fiber optic network 410 having a multi-level distributed hierarchical architecture. In FIG. 14, the distribution cable 12 is shown connected to and extending from local convergence cabinet 45 to mid-span access location 14 in branch 616. The local convergence cabinet 45 may be considered positioned at a first level. Two branch cables 20 connect to distribution cable 12 at the mid-span access location 14 and extend in two branches 716 and 816. One of the branch cables 20 extends to the optical connection terminal 618 in the branch 716, and one of the branch cables 20 extends to two optical connection terminals 118. Accordingly, the optical connection terminals 118 may be considered as positioned at a second level. The optical connection terminal 618 optically couples to the two optical connection terminals 118 as sub-branches of the branch 716 and, therefore may be considered as positioned at a third level.

The optical connection terminal 118 in the branch 816 is series connected to the two other optical connection terminals 118 in the manner as previously described above with reference to FIG. 11. The three optical connection terminals 118 in the branch 816 are designated as S-1, S-2, and S-3. The optical connection terminal 618 was depicted in and described with reference to FIG. 8, above. The branch 716 is similar to the branch 516 as previously described with reference to FIG. 13. In the branch 716, the optical connection terminal 618 is designated as B-1, while the two optical connection terminals 118 are designated as B-2 and B-3, respectively. In FIG. 14, though, the optical fibers F1-F12 retain their original designations as they optically couple to the optical connection terminals in the branches 616, 716, and 816.

The local convergence cabinet 45 comprises a termination field 47 having any number of ports. In FIG. 14 twelve ports are shown P1-P12. In FIG. 14, the distribution cable 12 comprises twelve optical fibers F1-F12 connected to the ports P1-P12, respectively. Due to the port mapping scheme, the optical connection terminals 118, 618 designated as S-1 and B-1, respectively, are configured such that the optical fibers F5, F6, F7, and F8 route to the drop ports 28 in those optical connection terminals. In other words, in a predetermined manner, the drop ports 28 in the optical connection terminals 118, 618 designated as S-1 and B-1 are operable for optically coupling the optical fibers F5, F6, F7, and F8 to the drop cables 24. Also, in a predetermined manner, at the local convergence cabinet 45, the optical fibers F5, F6, F7, and F8 route and connect to the ports P5, P6, P7, and P8. In this manner, the technician connecting the optical fibers at the local convergence cabinet will know that the fibers connected to the ports P5, P6, P7 and P8 will optically couple with the drop cables 24 via the drop ports 28 in the optical connection terminals B-1 and S-1.

Similarly, due to the port mapping scheme, the optical connection terminals 118 designated as S-2 and B-2, respectively, are configured such that the optical fibers F3, F4, F9, and F10 route to the drop ports 28 in those optical connection terminals. In other words, in a predetermined manner, the drop ports 28 in optical connection terminals 118 designated as S-2 and B-2 are operable for optically coupling the optical fibers F3, F4, F9, and F10 to the drop cables 24. Also, in a predetermined manner, at the local convergence cabinet 45, the optical fibers F3, F4, F9, and F10 route and connect to the ports P3, P4, P9, and P10. In this manner, the technician connecting the optical fibers at the local convergence cabinet will know that the fibers connected to the ports P3, P4, P9 and P10 will optically couple with the drop cables 24 via the drop ports 28 in the optical connection terminals S-2 and B-2.

In the same fashion, the technician connecting the optical fibers at the local convergence cabinet will know that the fibers connected to the ports P1, P2, P11 and P12 will optically couple with the drop cables 24 through the drop ports 28 in the optical connection terminals S-3 and B-3. In FIG. 14, the ports in the termination field 47 that are used to connect to the respective optical connection terminals are shown by three brackets with the optical fiber designations shown therein.

FIG. 14 is just exemplary of the manner in which a port mapping scheme may be used and is not intended to show the only type of port mapping scheme that may be used. Additionally, as shown in FIG. 14, the port mapping scheme may be used to configure other fiber optic network devices, including without limitation the local convergence cabinet 45 as well as the optical connection terminals. In this manner, the optical fibers in the distribution cable 12 and branch cable 20, as well as the ports in the fiber optic network devices and the drop ports in the optical connection terminals may be predetermined based on the port mapping scheme. As another non-limiting example, the local convergence cabinet 45 and the optical connection terminals 118, 618 in sub-branches 716, 816 may be configured with a port mapping scheme that provides for the optical fibers from optical connection terminals designated B-1 and S-1 to route and connect to ports P1-P4 of the local convergence cabinet 45. And, optical fibers from optical connection terminals designated B-2 and S-2 may route and connect to ports P5, P6, P7 and P8. Following in the same manner, optical fibers from optical connection terminals designated B-3 and S-3 may route and connect to ports P9, P10, P11 and P12. Moreover, by employing port mapping schemes, single or multi-level hierarchical architectures may be designed to facilitate expanding a fiber optic network towards the subscriber and accommodate the specific needs of the service provider in doing so.

Method of Port Mapping a Fiber Optic Network Device

Figure 15:
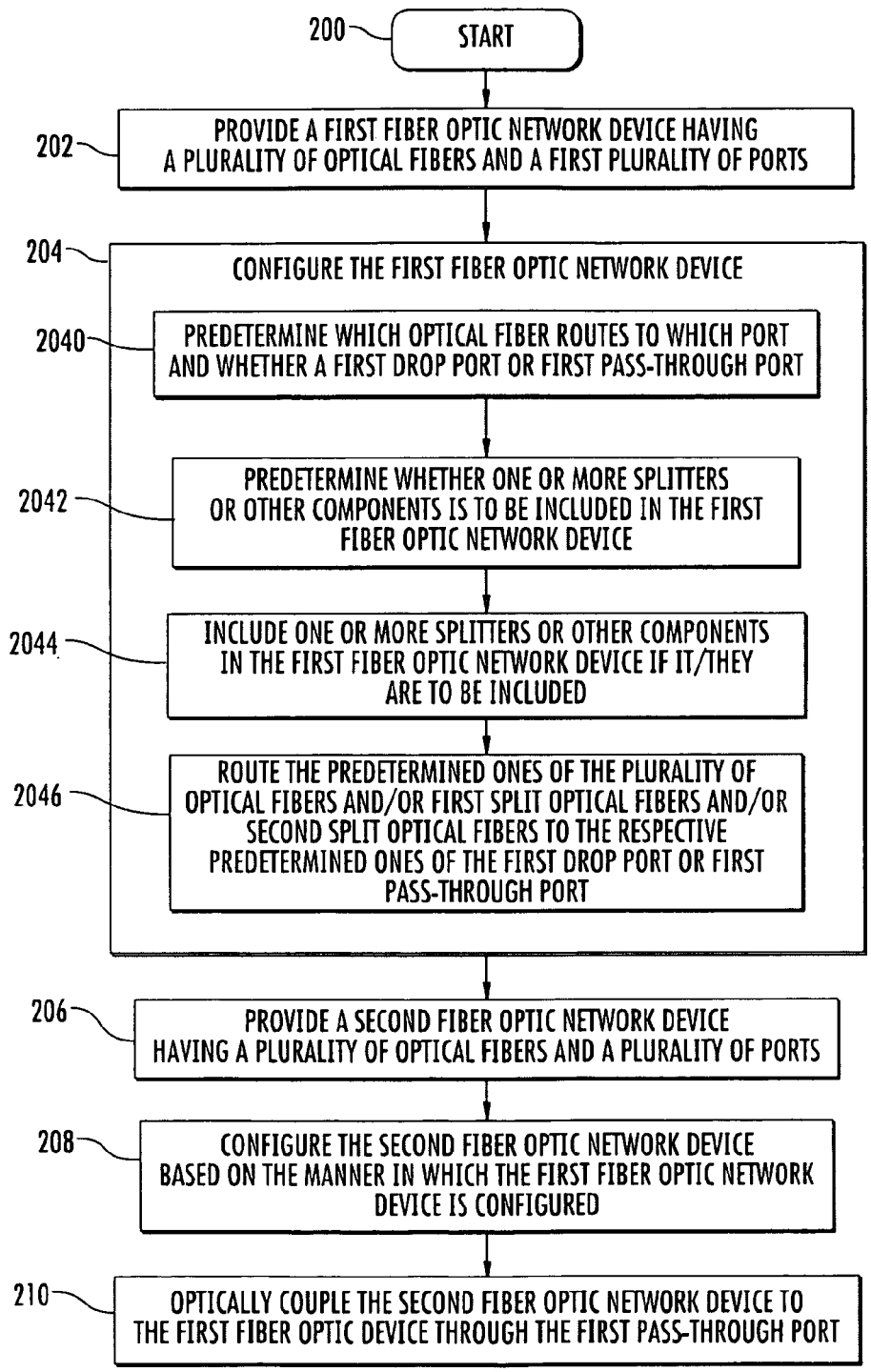
FIG. 15 is a flowchart illustrating a method of port mapping of a fiber optic network device, according to an exemplary embodiment.

Having described several exemplary embodiments of the port mapping schemes with respect to the optical connection terminals and the network architectures, there is now provided a description of an exemplary embodiment of a method of port mapping. The method of port mapping a fiber optic network device according to an exemplary embodiment is illustrated in FIG. 15. The operation starts at step 200 and a fiber optic network device is provided. (Step 202) The fiber optic network device may be any type or structure of device. The fiber optic network device may include a plurality of optical fibers and a first plurality of ports. In such a case, the fiber optic network device may be an optical connection terminal. Alternatively or additionally, the fiber optic network device may be a local convergence cabinet, in which case the fiber optic network device may include ports located in a termination field.

The fiber optic network device may be configured (Step 204), which may include predetermining which optical fiber routes to which port of the first plurality of ports. (Step 2040) The port may be a first drop port and/or a first pass-through port. Additionally, the configuring may include predetermining whether one or more splitters, and/or any other components, are to be included in the first fiber optic network device. (Step 2042) If so, then the one or more splitters and/or the other components may be configured by including them in the fiber optic network device. (Step 2044) The predetermined ones of the plurality of optical fibers may be routed to the respective predetermined ones of the first drop ports and/or the first pass-through port. (Step 2046) If one or more splitters are included, then a first split optical fiber from a first splitter and/or a second split optical fiber from a second splitter may be routed to the respective predetermined ones of the first drop ports and/or the first pass-through port.

A second fiber optic network device also may be provided. (Step 206) The second fiber optic network device may be configured based on the manner in which the first fiber optic device is configured. (Step 208) As a non-limiting example, the second fiber optic network device may be configured in the same manner as the first fiber optic device as shown in FIG. 11 and described above. In FIG. 11, three optical connection terminals 118 are configured in the same manner and optically coupled in a series arrangement. In other words, the three optical connection terminals 118 are depicted in FIG. 11 with the same port mapping scheme. Conversely, the second fiber optic network device may be configured differently than the first fiber optic network device, but in a manner based on the first fiber optic network device. A non-limiting example of this is illustrated in FIG. 12. In FIG. 12, the optical connection terminals 418, 318 are optically coupled in a primary/secondary series arrangement. The optical connection terminal 418 functions as the primary (PR) optical connection terminal, and therefore, the first fiber optic network device provided as shown in FIG. 15 at Step 202. And, the optical connection terminal 318 functions as the secondary (S) optical connection terminal, and therefore, the second fiber optic network device provided as shown in FIG. 15 at Step 206.

Although, in the primary/secondary series arrangement shown in FIG. 12, the second fiber optic network device has a different configuration than the first fiber optic network device, the different configurations provide different port mapping schemes to result in the primary/secondary arrangement. Whether the first fiber optic network device and the second fiber optic network device have or have not the same configurations, the second fiber optic network device optically couples with the first fiber optic network device to apply the port mapping scheme to achieve the arrangement of fiber optic network devices, and, thereby, the desired architecture of the fiber optic network. (Step 210) The desired architecture may be a multi-level architecture involving branch and tiered sub-branch arrangements resulting from the configurations of the first fiber optic network device and the second fiber optic network device, as described above and illustrated in FIGS. 13 and 14, as well as other series and sub-branching arrangements.

Examples of Optical Connection Terminal Structures with Port Mapping Schemes therein The optical connection terminals 118, 218, 318, 418, 518, 618, 718 may be any type of fiber optic network device and, therefore, may have any structure. Accordingly, without limiting in any manner the type or structure of fiber optic network device in which the present invention may be practiced, an exemplary embodiment of a fiber optic network device in the form of a multi-port device will now be described with reference to FIGS. 16-19.

Figure 16:
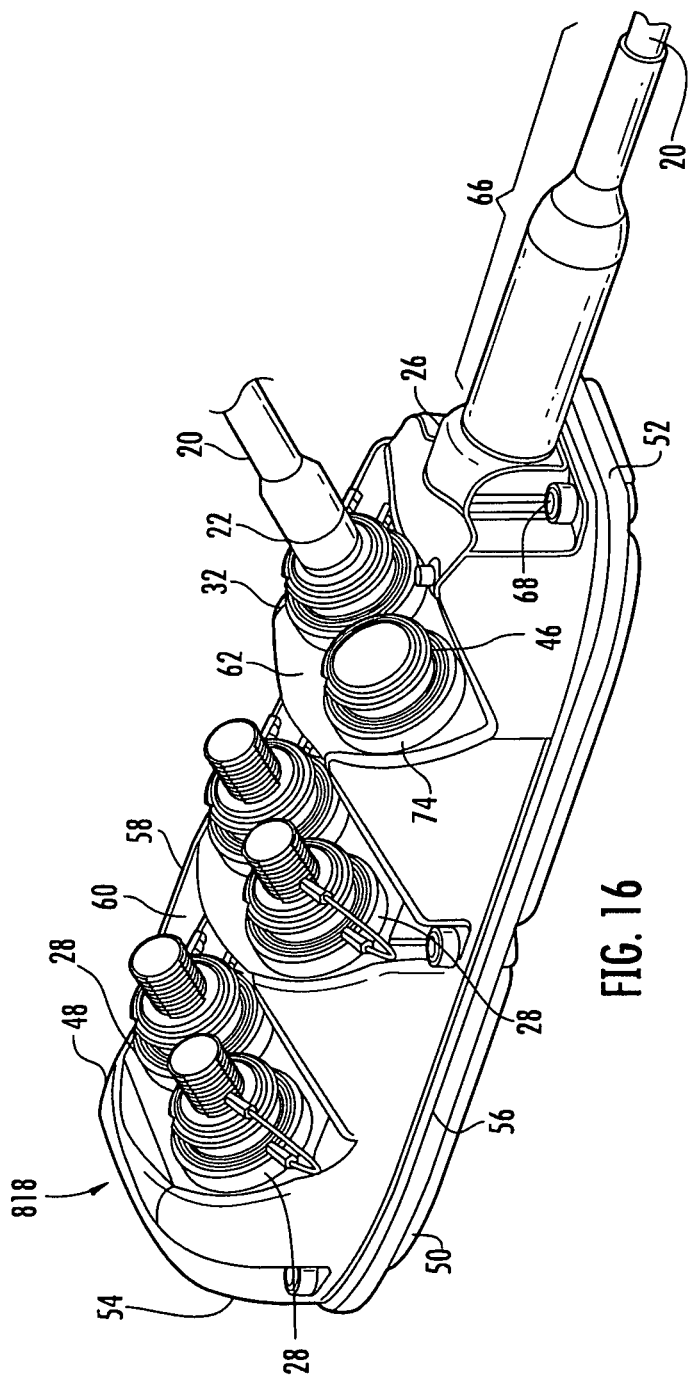
FIG. 16 is a perspective view of a structure of a optical connection terminal having four ports, according to an exemplary embodiment.
Figure 17:
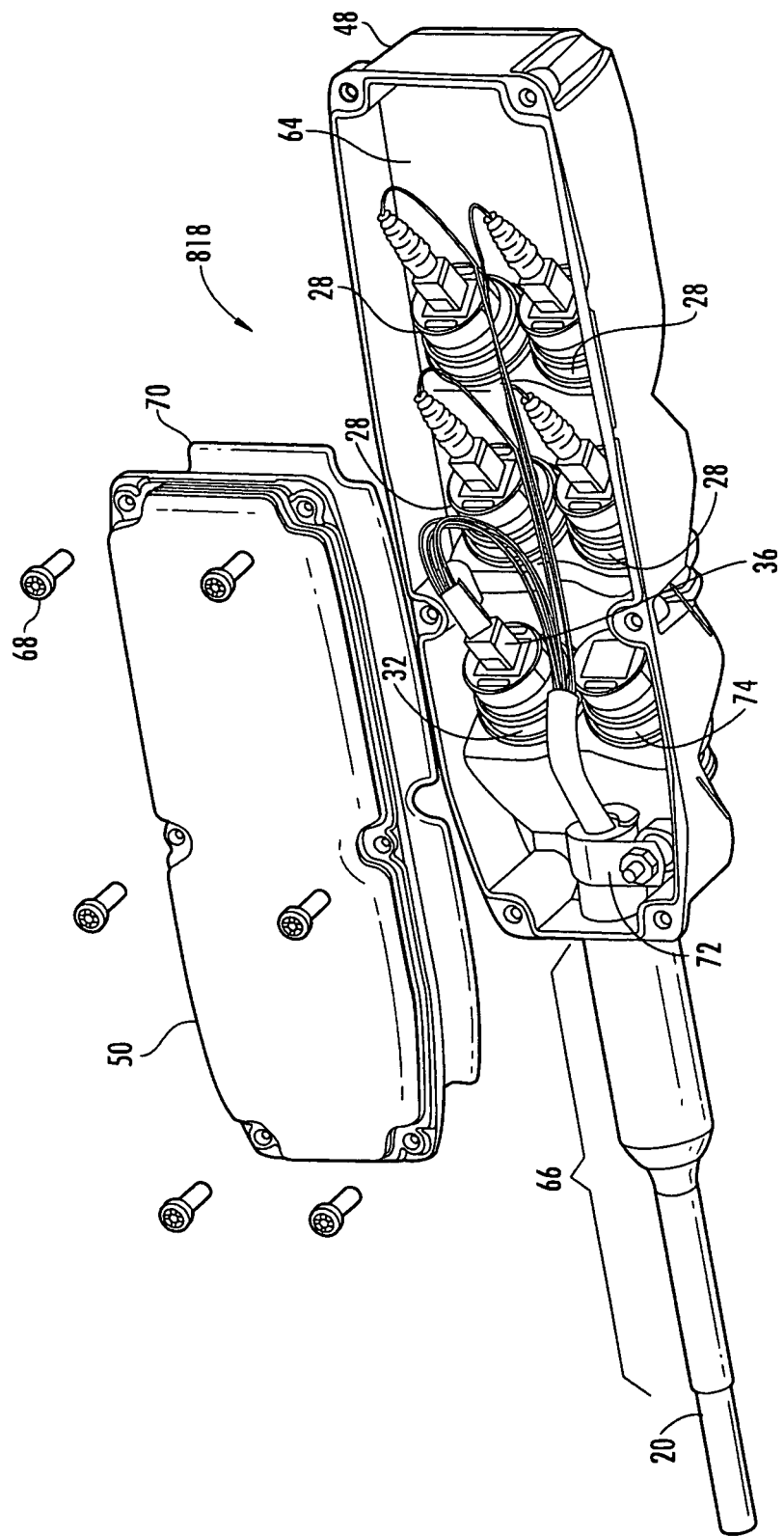
FIG. 17 is an internal perspective view of the structure of the optical connection terminal of FIG. 16, illustrating the predetermined routing of optical fibers based on a port mapping scheme, according to an exemplary embodiment.

Turning now to FIGS. 16 and 17, an exemplary embodiment of a multi-port device as an optical connection terminal 818 in accordance with the present invention is shown. As shown in FIG. 16, the optical connection terminal 818 comprises a base 48 and a cover 50 each made of a lightweight, yet rigid material, such as plastic, thermoplastic, composite or aluminum material. The base 48 and the cover 50 define an enclosure having an exterior surface. Additionally, the base 48 has opposed end walls 52, 54 and sidewalls 56, 58, of the exterior surface. The base 48 is further provided with an upper surface 60 of the exterior surface. The upper surface 60 of the base 48 is provided with a plurality of angled or sloped surfaces 62. Each angled surface 62 has at least one drop connector port 28 formed therethrough. Further, the base 48 is generally box-shaped and defines an interior cavity 64 for housing fiber optic hardware, such as connector ports, adapters, optical fiber routing guides, fiber hubs and the like. The base 48 may have any of a variety of shapes that is suitable for housing fiber optic hardware and for routing and connecting optical fibers of the branch cable 20, as described herein. However, by way of example only, the base 48 of this embodiment is generally rectangular and is elongated in the lengthwise direction relative to the widthwise direction between the opposed end walls 52, 54.

A branch cable port 26 is disposed through the exterior surface. Although the branch cable port 26 may be at any position through the exterior surface, in the embodiment shown, the branch cable port 26 is disposed in the end wall 52 of the base 48. The branch cable port 26 is operable for receiving a branch cable assembly 66 comprising the branch cable 20. The branch cable assembly 66 is inserted through the branch cable port 26 of the optical connection terminal 818. The end of the branch cable 20 having at least one pre-connectorized optical fiber mounted thereon is routed through the branch cable port 26 into the interior cavity 64. The branch cable assembly 66 is any type of assembly or structure that provides for the entrance of the branch cable 20 into the optical connection terminal 818, and the sealing of the branch cable 20 as it enters the optical connection terminal

818. Additionally, the branch cable assembly 66 may provide strain relief to the branch cable 20 as is known in the art. Alternatively, a multi-fiber connector (not shown) may be used to connect the branch cable 20 to the optical connection terminal 818. In such case, instead of the branch cable assembly 66 as depicted in FIGS. 16 and 17, the multi-fiber connector may be connected to an adapter seated within the branch cable port 26. Another multi-fiber connector (not shown) may be used to connect to the adapter in the interior cavity 64, thereby optically connect the optical fibers of the branch cable 20 to optical fibers disposed within the optical connection terminal 818.

The cover 50 is adapted to be attached to the base 48 such that the optical connection terminal 818 is re-enterable to provide ready access to the interior cavity 64, particularly in the field, if necessary to reconfigure the optical fibers of the branch cable 20 relative to the drop ports 28 and the pass-through port 32. Specifically, the base 48 and cover 50 are preferably provided with a fastening mechanism 68 such as, but not limited to, clasps, fasteners, threaded bolts or screws and inserts, or other conventional means for securing the cover 50 to the base 48 in the closed configuration. However, the cover 48 may be slidably attached to the base 50 to selectively expose portions of the interior cavity 64 of the base 48. Alternatively, the cover 50 may be hingedly attached to the base 48 at one or more hinge locations (not shown) to allow the cover 50 and base 48 to remain secured to one another in the opened configuration. A gasket 70 may be disposed between a peripheral flange provided on the base 48 and the interior of the cover 50. As shown, the gasket 70 is generally rectangular and of a size corresponding to that of the base 48 and the cover 50. Alternatively, in certain locations the service provider may determine that it is not desirable that optical connection terminal 818 be enterable in the field, and, therefore, may decide to fasten the base 48 to the cover 50 by welding, for example using an epoxy type of weld.

As illustrated in FIG. 17, the branch cable 20 passes through the branch cable port 26 and enters the optical connection terminal 818. A securing mechanism 72, such as for example, a fastener, clamp and nut, bracket or clasp, is provided in the interior cavity 64 of the optical connection terminal 818 to secure the branch cable 20 to the base 48. Alternatively, instead of the branch cable 20 passing through the branch cable port 26, the branch cable 20 may have a connector on the end, which, in such case, would connect with an adapter seated in the branch cable port 20. Also, alternatively, the optical fibers in the branch cable 20 may be splice, for example, fusion spliced, with optical fibers in the interior cavity. In this embodiment, the branch cable 20 is a twelve fiber optical cable. It should be understood that the present invention is not limited to a branch cable 20 having any specific number of optical fibers. A branch cable 20 having less or more than twelve optical fibers may be used. Within the optical connection terminal 818, at least one individual optical fiber of the branch cable 20 in the form of a pigtail terminates at its respective connector. The pre-connectorized optical fiber or pigtail is routed within the interior cavity 64 of the optical connection terminal 818 and connects to an adapter 34 (not shown) seated within the respective drop port 28. The optical fiber or pigtail may be pre-connectorized with any suitable connector, for example, an SC connector available from Corning Cable Systems LLC of Hickory, N.C. In FIG. 17 four pre-connectorized optical fibers are shown each connecting to the respective drop port 28. A field-connectorized or pre-connectorized drop cable 24 may be connected to the adapter 34 seated within the drop port 28 from the exterior of the optical connection terminal 68. The drop cable 24 may be connectorized or pre-connectorized with any suitable ruggedized connector, for example, an OptiTap® or OptiTip® connector available from Corning Cable Systems LLC of Hickory, N.C.

Additionally, optical fibers of the branch cable 20 may be connected to a pass-through connector 36 (not shown). The pass-through connector 36 may be any type of multi-fiber connector, such as an MTP connector available from Corning Cable Systems LLC of Hickory, N.C. Alternatively, a splice, such as a fusion splice may be used instead of a pass-through connector 36. In this embodiment, eight optical fibers of the branch cable 20 connected to a twelve port pass-through connector 36. The pass-through connector 36 connects to a multi-fiber adapter 38 seated in the pass-through connector port 32. A segment of the branch cable 20 that extends to another optical connection terminal connects to the multi-fiber adapter 38 through a network connector 22 external to optical connection terminal 818. As described above, the network connector 22 may be any type of multi-fiber connector, such as an OptiTip fiber optic connector. Thus, the multi-fiber adapter 38 may be a MTP/OptiTip adapter to accept and connect the branch connector 36, a MTP connector, and the network connector 22, an OptiTip connector. In this manner, the optical connection terminal 818 may be series and/or sub-branch connected with another optical connection terminal 818. A spare port 66, is shown in FIGS. 16 and 17 with a cap 46 attached thereon. The spare port 66 may be used for an additional drop port 28 or the pass-through port 32, or an additional pass-through port 32. In this manner, optical coupling according to a port mapping scheme may be established between certain of the optical fibers of the branch cable 20 in the interior cavity 64 and to the branch cable 20 that extends between optical connection terminals.

Figure 18:
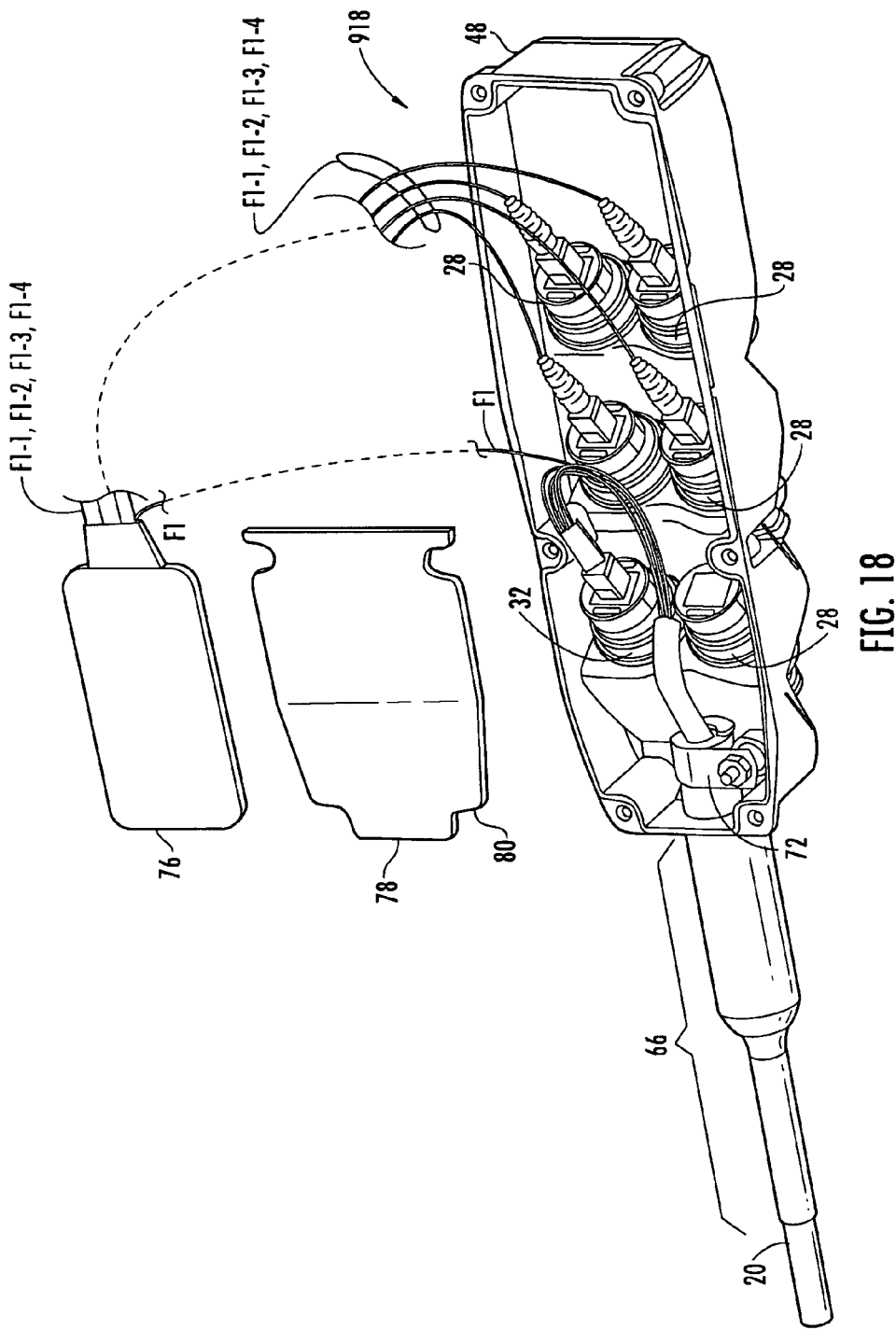
FIG. 18 is an internal perspective view of a structure of an optical connection terminal having four ports, illustrating the predetermined routing of optical fibers based on a port mapping scheme, according to an exemplary embodiment.

In FIG. 18 another exemplary embodiment of a structure of an optical connection terminal in accordance with the present invention is shown. In this embodiment, the optical connection terminal 919 is similar to the optical connection terminal 818 depicted in FIGS. 16 and 17, and, therefore, like components will not be discussed again with reference to FIG. 18. The optical connection terminal 918 in FIG. 18 includes a splitter 76. Although, only one splitter 76 is shown in this embodiment, it should be understood that the invention is not limited to one splitter 76 and multiple splitters 76 may be included, for example the splitters 40, 42, and 44 depicted in FIGS. 5 and 6. The splitter 76 may be mounted on a shelf 78 having at least one cutout 80. One or more fastening mechanisms 68 (not shown) may be used to affix the splitter 76 to the base 48 using the fastening mechanisms 68.

In this embodiment, the splitter 76 may be a 1×4 splitter in that one optical signal input to the splitter 76 may be split into four optical signals output from the splitter 76. Please note that since the optical signals may travel in both directions, the operation of the splitter 76 may be viewed from the reverse optical signal direction, in which case four optical signals input to the splitter 76 will be coupled into one optical signal output from the splitter 76. One optical fiber indicated in FIG. 18 as F1 from the twelve fiber branch cable 20 routes to and optically couples with the splitter 76, and the other optical fibers of the branch cable 20 route to the pass-through port 32. Four first split optical fibers indicated in FIG. 18 as F1-1, F1-2, F1-3, and F1-4 are output from the splitter 76. Each of the first split optical fibers output from the splitter 76 may be pre-connectorized and routed to one or more drop ports 28. Further, as discussed above, more than one splitter 76 may be included in the optical connection terminal 918, in which case, the optical fibers may route between the splitters 76 and the drop ports 28 and/or pass-through port(s) 32 according to the port mapping scheme employed.

Turning now to FIG. 19, there is depicted an exemplary embodiment of an optical fiber management shelf 82 for a fiber optic network device. In FIG. 19, the fiber optic network device may be an optical connection terminal (not shown). As shown in FIG. 19, the fiber management shelf 82 comprises a platform 83 having bottom side 84 and a top side 85. The platform 83 has an outer wall 86 on the edge along the perimeter of the platform 83. An access opening 87 extends through the platform 83. The access opening 87 has an inner wall 88 on the edge of the access opening 87. A transition area 89 extends from the access opening 87. Tabs 90 extend downwardly from the side of the platform 83. Although in FIG. 19 only one tab 90 is shown, more than one tab may be included. The fiber management shelf 82 installs in the interior cavity 64 of the optical connection terminal and affixes to the base 48 such that it positions above the ports 28, 32. The tabs 90 insert into respective slots (not shown) in the base 48 to removably affix the fiber management shelf 82 to the base 48. A splice protector 92 and a splitter 93 are shown mounted on the platform 83. Although one splice protector 92 and one splitter 93 are shown in FIG. 19, the fiber management shelf may include any number of splice protectors 92 and splitters 93. Additionally or alternatively, the fiber management shelf may include any number of other components, for example, without limitation, WDM devices.

One or more optical fibers 94 in a branch cable 20 that has entered the optical connection terminal may be routed under the platform 83 toward the transition area 89. The optical fibers 94 extend through access opening 87 at the transition area 89 and route on the top side 85 to splice protector 92. Thus, the top side 85 provides a routing area for the optical fibers. The optical fibers 94 splice to respective spliced optical fibers 96. The splice is positioned in splice protector 96. The spliced optical fibers 96 may be pigtails in that the end of the spliced optical fiber 96 extending from the splice protector 92 may be connectorized. The other end, the spliced end, of the spliced optical fiber 96 in the splice protector 92 may not be connectorized. The spliced optical fibers 96 route around the top side 85 to splitter 93. Alternatively, the spliced optical fibers 96 may route to a port, if, for example, the optical connection terminal does not include a splitter 93.

In splitter 93, the optical signals carried by spliced optical fibers 96 are split into multiple optical signals each carried by a first split optical fiber 98. Although four first split optical fibers 98 are shown in FIG. 19, the splitter 93 may split the optical signals into any number of optical signals based on the number of ports and the port mapping scheme used in the optical connection terminal. The first split optical fibers 98 may be pigtails in that the end of the first split optical fibers 98 extending from the splitter 93 may be connectorized. The split optical fibers 98 route through the access opening 87 at transition area 89 to predetermined drop ports 28 and/or pass-through ports 32 based on the type of optical connection terminal and the port mapping scheme used.

The outer wall 86 protects the optical fibers from falling into the base 48 along a side of the base 48. The inner wall 88 protects the optical fibers from falling through the access opening. A cover 102 may be included and adapted to position over the platform and secure the optical fibers and the components in place. Additionally, a foam pad 104 may be positioned between the cover and the platform to add additional security and protection to the optical fibers and the components. The cover 102 and/or the foam pad 104 may be held in place by any suitable means, including without limitation adhesives, clips, tabs, cable ties, adhesive tapes, hook and loop fasteners, as well as pressure from the optical connection terminal cover.

The fiber management shelf 82 may include other structures such as, without limitation, routing guides to direct the optical fiber and assure that the optical fiber does not bend too tightly and stays within the required bending limitation for the optical fiber. Also, the fiber management shelf 82 may be structured as a universal shelf for mounting on any optical connection terminal. Further, the fiber management shelf 82 may be configured and/or pre-configured with the desired components at the factory or in the field as necessary for the particular optical connection terminal and/or port mapping scheme.

Many other modifications and embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic network device for optically coupling a fiber optic distribution cable with fiber optic drop cables, the device comprising:
   a plurality of optical fibers configured to be optically coupled to the distribution cable, wherein the plurality of optical fibers is disposed within the fiber optic network device; and
   a plurality of ports opening into the fiber optic network device, wherein ones of the plurality of ports are operable for optically coupling respective ones of the plurality of optical fibers each to at least one drop cable external to the fiber optic network device according to a first predetermined port mapping scheme.

2. The fiber optic network device of claim 1, wherein at least one of the ones of the plurality of ports is a pass-through port operable for optically coupling at least one of the respective ones of the plurality of optical fibers to the at least one drop cable through another fiber optic network device optically connected between the pass-through port and the at least one drop cable according to a second predetermined port mapping scheme.

3. The fiber optic network device of claim 2, further comprising a pass-through connector seated within the pass-through port, wherein the pass-though connector comprises a plurality of connection ports adapted for receiving in an alignment the respective ones of the plurality of optical fibers according to a second predetermined port mapping scheme.

4. The fiber optic network device of claim 3, wherein the first predetermined port mapping scheme and the second predetermined port mapping scheme are the same.

5. The fiber optic network device of claim 1, wherein the fiber optic network device comprises an optical connection terminal.

6. The fiber optic network device of claim 1, wherein the fiber optic network device comprises a plurality of optical connection terminals, and wherein at least two of the plurality of optical connection terminals are interchangeable in a fiber optic network based on the ones of the ports and the respective ones of the plurality of optical fibers based on at least one of the first predetermined port mapping scheme and the second predetermined port mapping scheme.

7. The fiber optic network device of claim 1, wherein the fiber optic network device comprises a distribution closure associated with an optical connection terminal.

8. The fiber optic network device of claim 1, further comprising a splitter, wherein at least one of the ones of a plurality of ports is operable to optically couple at least one of the respective ones of the plurality of optical fibers to one of the at least one drop cable according to a third predetermined port mapping scheme, and wherein the at least one of the respective ones of the plurality of optical fibers inputs to the splitter, and an optical fiber outputs from the splitter and connects to the at least one of the ones of the plurality of ports according to the third predetermined port mapping scheme.

9. The fiber optic network device of claim 8, wherein the splitter comprises a 1×4 splitter.

10. The fiber optic network device of claim 8, wherein the splitter comprises a 1×8 splitter.

11. The fiber optic network device of claim 8, wherein the splitter comprises a plurality of splitters, and wherein at least one of the plurality of splitters is a 1×4 splitter, and wherein at least one of the plurality of splitters is a 1×8 splitter adapted to receive at least one of the ones of the plurality of optical fibers as an output from the 1×4 splitter.

12. An optical connection terminal for optically connecting a fiber optic distribution cable with fiber optic drop cables, the optical terminal comprising:
   an enclosure defining an exterior surface and an interior cavity, wherein the enclosure has a cable opening in the exterior surface configured for receiving a first segment of a branch cable having a plurality of optical fibers optically coupled to the fiber optic distribution cable; and
   a plurality of ports disposed in the exterior surface, wherein the optical connection terminal is configured such that ones of the plurality of ports are operable for optically coupling ones of the plurality of optical fibers each to at least one drop cable external to the optical connection terminal according to a predetermined port mapping scheme.

13. The optical connection terminal of claim 12, wherein the plurality of ports comprises at least one drop port and at least one pass-through port, and wherein the pass-through port is operable for optically coupling certain of the ones of the plurality of optical fibers to the at least one drop cable through another optical connection terminal external to the optical connection terminal according to the first predetermined port mapping scheme.

14. The optical connection terminal of claim 13, wherein each of the at least one pass-through port has a pass-through connector seated therein, and wherein the pass-though connector comprises a plurality of connection ports adapted for receiving in an alignment according to the first predetermined port mapping scheme the certain of the ones of the plurality of optical fibers.

15. The optical connection terminal of claim 14, wherein the another optical connection terminal comprises a second pass-through port having a second pass-through connector, and wherein the second pass-through connector has connection ports adapted for receiving a plurality of optical fibers in the alignment.

16. The optical connection terminal of claim 12, further comprising a splitter, wherein at least one of the plurality of ports is operable to optically couple at least one of the plurality of optical fibers to a drop cable according to a second predetermined port mapping scheme, and wherein the at least one of the plurality of optical fibers inputs to the splitter, and an optical fiber outputs from the splitter and connects to the at least one of the plurality of ports.

17. The optical connection terminal of claim 16, wherein the splitter comprises a 1×4 splitter.

18. The optical connection terminal of claim 16, wherein the splitter comprises a 1×8 splitter.

19. The optical connection terminal of claim 16, wherein the splitter comprises a plurality of splitters, and wherein at least one of the plurality of splitters is a 1×4 splitter, and wherein at least one of the plurality of splitters is a 1×8 splitter adapted to receive at least one optical fiber output from the 1×4 splitter according to the second predetermined port mapping scheme.

20. A method for optically coupling a fiber optic distribution cable with fiber optic drop cables, the method comprising:
   disposing a plurality of optical fibers optically coupled to the fiber optic distribution cable in a fiber optic network device;
   providing a plurality of ports opening into the fiber optic network device; and
   configuring the fiber optic network device wherein the ones of the plurality of ports are operable for optically coupling the ones of the plurality of optical fibers each to a drop cable external to the fiber optic device according to a first predetermined port mapping scheme.

21. A method for optically coupling a fiber optic distribution cable with fiber optic drop cables, the method comprising:
   providing an optical connection terminal comprising an enclosure defining an exterior surface and an interior cavity, wherein the enclosure has a cable opening in the exterior surface for receiving a first segment of a branch cable having a plurality of optical fibers optically coupled to the fiber optic distribution cable; and
   disposing a plurality of ports in the exterior surface, wherein the plurality of ports open into the interior cavity;
   pre-configuring the optical connection terminal wherein one of the plurality of ports is operable for optically coupling ones of the plurality of optical fibers each to at least one drop cable external to the optical connection terminal according to a first predetermined port mapping scheme.

22. The fiber optic network device of claim 2 further comprising:
   an enclosure defining an exterior surface and an interior cavity, wherein the enclosure has a cable opening in the exterior surface for receiving a first segment of a branch cable comprising the plurality of optical fibers optically coupled to the distribution cable, and wherein the plurality of ports are disposed in the exterior surface.

23. The fiber optic network device of claim 22, wherein the pass-through port connects to a second segment of the branch cable for optically coupling at least one of the respective ones of the plurality of optical fibers to the at least one drop cable through another fiber optic network device according to a second predetermined port mapping scheme.

24. The fiber optic network device of claim 23, further comprising a multi-fiber connector seated in the pass-through port, wherein the multi-fiber connector is adapted to optically connect the second segment of the branch cable to the fiber optic network device according to the second predetermined port mapping scheme.

25. The fiber optic network device of claim 24, wherein the multi-fiber connector optically couples ones of the respective predetermined ones of the plurality of optical fibers to the second segment of the branch cable in a predetermined alignment based on the second predetermined port mapping scheme.

\* \* \* \* \*